US012641681B2

(12) United States Patent
Narematsu

(10) Patent No.: US 12,641,681 B2
(45) Date of Patent: May 26, 2026

(54) FAULT DETECTION DEVICE, LOAD DRIVING DEVICE, FAULT DETECTION METHOD AND STORAGE MEDIUM

(71) Applicant: TOYOTA JIDOSHA KABUSHIKI KAISHA, Toyota (JP)

(72) Inventor: Tomohiro Narematsu, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1195 days.

(21) Appl. No.: 17/644,834

(22) Filed: Dec. 17, 2021

(65) Prior Publication Data

US 2022/0240349 A1 Jul. 28, 2022

(30) Foreign Application Priority Data

Jan. 22, 2021 (JP) ................................. 2021-008772

(51) Int. Cl.
*H05B 1/02* (2006.01)
*H02H 1/00* (2006.01)
*H02H 3/16* (2006.01)

(52) U.S. Cl.
CPC ......... *H05B 1/0202* (2013.01); *H02H 1/0007* (2013.01); *H02H 3/16* (2013.01); *H05B 1/0236* (2013.01)

(58) Field of Classification Search
CPC .. H05B 1/0202; H05B 1/0236; H02H 1/0007; H02H 3/16
USPC ......................................... 219/481, 211, 549
See application file for complete search history.

(56) References Cited

U.S. PATENT DOCUMENTS

| | | | | |
|---|---|---|---|---|
| 4,932,246 | A | * | 6/1990 | Deutsch ............. G01R 31/2829 |
| | | | | 73/114.45 |
| 6,232,781 | B1 | | 5/2001 | Göser et al. |
| 6,664,802 | B2 | * | 12/2003 | Wimmer .............. G01R 31/007 |
| | | | | 324/765.01 |
| 10,326,264 | B1 | * | 6/2019 | Gass ...................... H02H 3/044 |
| 2001/0048367 | A1 | | 12/2001 | Wimmer et al. |
| 2009/0212967 | A1 | * | 8/2009 | Bonasia ................. H02H 3/335 |
| | | | | 340/4.32 |

(Continued)

FOREIGN PATENT DOCUMENTS

| | | |
|---|---|---|
| JP | 2002-272177 A | 9/2002 |
| JP | 2003-536076 A | 12/2003 |
| JP | 2020-137089 A | 8/2020 |

*Primary Examiner* — Yeong Juen Thong
(74) *Attorney, Agent, or Firm* — Oblon, McClelland, Maier & Neustadt, L.L.P.

(57) ABSTRACT

A fault detection device for a driving circuit that includes a first switch provided between an electric load and a power supply section, a second switch provided between the electric load and earth, and a detector that detects a voltage between the first switch and the electric load, the fault detection device including: a memory; and a processor coupled to the memory and being configured to: control the first switch into an on state connecting the electric load with the power supply section or an off state disconnecting the electric load from the power supply section; control the second switch into an on state connecting the electric load with earth or an off state disconnecting the electric load from earth; and determine a fault of the driving circuit based on the on or off state of the first and second switches and a voltage detected by the detector.

9 Claims, 23 Drawing Sheets

(56)                    References Cited

U.S. PATENT DOCUMENTS

2020/0275527 A1*    8/2020  Sakamoto ............ H05B 1/0202
2021/0159690 A1*    5/2021  Sorenson ............. H04L 67/125

* cited by examiner

FIG.13

| | | BOTH RELAYS OFF (HIGH-SIDE RELAY: OFF, LOW-SIDE RELAY: OFF) | | LOW-SIDE RELAY ON (HIGH-SIDE RELAY: OFF, LOW-SIDE RELAY: ON) | | BOTH RELAYS ON (HIGH-SIDE RELAY: ON, LOW-SIDE RELAY: ON) | | OVERALL DETECTION POSSIBILITY |
|---|---|---|---|---|---|---|---|---|
| | | MONITOR VOLTAGE | DETECTABLE? | MONITOR VOLTAGE | DETECTABLE? | MONITOR VOLTAGE | DETECTABLE? | |
| NORMAL | | V2 | - | 0 | - | V3 | - | - |
| FAULTY | HIGH-SIDE +B SHORT CIRCUIT | V4 | △ | V4 | ○ | V4 | × | ○ |
| | HIGH-SIDE GND SHORT CIRCUIT | 0 | ○ | 0 | × | 0 | ○ | ○ |
| | HIGH-SIDE OPEN CIRCUIT | V2 | × | V2 | ○ | V4 | × | ○ |
| | HIGH-SIDE ON-STICKING | V4 | △ | V4 | ○ | V3 | × | ○ |
| | HIGH-SIDE OFF-STICKING | V1 | × | 0 | × | 0 | ○ | ○ |
| | LOW-SIDE +B SHORT CIRCUIT | V4 | △ | V4 | ○ | V4 | × | ○ |
| | LOW-SIDE GND SHORT CIRCUIT | 0 | ○ | 0 | × | V4 | × | ○ |
| | LOW-SIDE OPEN CIRCUIT | V2 | × | V2 | ○ | V4 | × | ○ |
| | LOW-SIDE ON-STICKING | 0 | ○ | 0 | × | V3 | × | ○ |
| | LOW-SIDE OFF-STICKING | V1 | × | V1 | ○ | V4 | × | ○ |

$0 < V1 \fallingdotseq V2 < V3 \fallingdotseq V4$

FIG.18

| | | BOTH RELAYS OFF (HIGH-SIDE RELAY: OFF, LOW-SIDE RELAY: OFF) | | HIGH-SIDE RELAY ON (HIGH-SIDE RELAY: ON, LOW-SIDE RELAY: OFF) | | LOW-SIDE RELAY ON (HIGH-SIDE RELAY: OFF, LOW-SIDE RELAY: ON) | | BOTH RELAYS ON (HIGH-SIDE RELAY: ON, LOW-SIDE RELAY: ON) | | OVERALL DETECTION POSSIBILITY |
|---|---|---|---|---|---|---|---|---|---|---|
| | | MONITOR VOLTAGE | DETECTABLE? | MONITOR VOLTAGE | DETECTABLE? | MONITOR VOLTAGE | DETECTABLE? | MONITOR VOLTAGE | DETECTABLE? | |
| NORMAL | | V2 | – | V4 | – | 0 | – | V3 | – | – |
| FAULTY | HIGH-SIDE +B SHORT CIRCUIT | V4 | △ | V4 | × | V4 | ○ | V4 | × | ○ |
| | HIGH-SIDE GND SHORT CIRCUIT | 0 | ○ | 0 | ○ | 0 | × | 0 | ○ | ○ |
| | HIGH-SIDE OPEN CIRCUIT | V2 | × | V4 | × | V2 | ○ | V4 | × | ○ |
| | HIGH-SIDE ON-STICKING | V4 | △ | V4 | × | V4 | ○ | V3 | × | ○ |
| | HIGH-SIDE OFF-STICKING | V1 | × | V1 | △ | 0 | × | 0 | ○ | ○ |
| | LOW-SIDE +B SHORT CIRCUIT | V4 | △ | V4 | × | V4 | ○ | V4 | × | ○ |
| | LOW-SIDE GND SHORT CIRCUIT | 0 | ○ | V4 | × | 0 | × | V4 | × | ○ |
| | LOW-SIDE OPEN CIRCUIT | V2 | × | V4 | × | V2 | ○ | V4 | × | ○ |
| | LOW-SIDE ON- | 0 | ○ | V4 | × | 0 | × | V3 | × | ○ |
| | LOW-SIDE OFF-STICKING | V1 | × | V4 | × | V1 | ○ | V4 | × | ○ |

0＜V1≒V2＜V3≒V4

FAULT DETECTION DEVICE, LOAD DRIVING DEVICE, FAULT DETECTION METHOD AND STORAGE MEDIUM

CROSS-REFERENCE TO RELATED APPLICATION

This application is based on and claims priority under 35 USC 119 from Japanese Patent Application No. 2021-008772 filed on Jan. 22, 2021, the disclosure of which is incorporated by reference herein.

BACKGROUND

Technical Field

The present disclosure relates to a fault detection device, a load driving device, a fault detection method and a non-transitory storage medium storing a fault detection program.

Related Art

A control device described in Japanese Patent Application Laid-Open (JP-A) No. 2020-137089 includes high-side wiring that connects between a heater and a power supply, low-side wiring that connects between the heater and a ground part, sense wiring that is connected to a heating electrode of the heater, and a failure detector that detects a failure in any of the wiring connected to the heater. On the basis of each of a high-side voltage, a low-side voltage, a sense voltage, a high-side current and a low-side current, the failure detector identifies a mode of a failure that occurs and a location at which the failure occurs.

For the technology described in JP-A No. 2020-137089 to detect a fault of a driving circuit, voltages and currents at plural locations of the driving circuit must be acquired, specifically the high-side voltage, low-side voltage, sense voltage, high-side current and low-side current. Therefore, with the technology recited in JP-A No. 2020-137089, structures for detecting faults of the driving circuit are complicated.

SUMMARY

In consideration of the circumstances described above, the present disclosure provides a fault detection device that may realize detection of a fault of a driving circuit with a simple structure, and a load driving device, a fault detection method, and a non-transitory storage medium storing a fault detection program.

A first aspect of the present disclosure is a fault detection device for detecting a fault of a driving circuit that includes a first switch provided between an electric load and a power supply section, a second switch provided between the electric load and earth, and a detection section that detects a voltage between the first switch and the electric load, the fault detection device including: a memory; and a processor coupled to the memory, the processor being configured to: perform control to put the first switch into an on state connecting the electric load with the power supply section or an off state disconnecting the electric load from the power supply section; perform control to put the second switch into an on state connecting the electric load with earth or an off state disconnecting the electric load from earth; and determine a fault of the driving circuit on the basis of the on or off state of the first switch and the second switch and a voltage detected by the detection section.

According to the first aspect, the first switch is controlled to the on state or off state thereof and the second switch is controlled to the on state or off state thereof. A fault of the driving circuit is determined on the basis of the on and off states of the first switch and second switch and a voltage detected by the detection section that detects the voltage between the first switch and the electric load. Thus, in the first aspect, because a fault of the driving circuit is determined on the basis of the voltage between the first switch and the electric load, there is no need to acquire voltages and currents at plural locations of the driving circuit, and detection of a fault of the driving circuit may be realized with a simple structure.

A second aspect may be configured such that the processor is further configured to: successively switch the first switch and the second switch into plural conditions that differ from one another in the on and off states of the first switch and the second switch; and determine a fault of the driving circuit on the basis of the on or off states of the first switch and the second switch in each of the plural conditions and voltages respectively detected by the detection section in the plural conditions.

According to the second aspect, the first switch and the second switch are successively switched into the plural conditions with mutually different on and off states, and a fault of the driving circuit is determined on the basis of the respective on or off state of the first switch and the second switch in the plural conditions and of the voltages respectively detected by the detection section in the plural conditions. Therefore, a fault of the driving circuit may be detected for comprehensively.

A third aspect may be configured such that the processor is further configured to: control on and off states of the first switch and the second switch at a time of start-up of the driving circuit; and determine a fault of the driving circuit on the basis of the on or off state of the first switch and the second switch at the time of start-up of the driving circuit and the voltage detected by the detection section.

According to the third aspect, determining a fault of the driving circuit by controlling the on and off states of the first switch and the second switch at the time of start-up of the driving circuit may contribute to the driving circuit driving the electric load promptly, in a case in which it is determined that there is no fault of the driving circuit.

A fourth aspect may be configured such that the processor is further configured to: successively switch the first switch and the second switch into plural conditions that differ from one another in the on and off states of the first switch and the second switch; and determine a fault of the driving circuit by comparing voltages respectively detected by the detection section in the plural conditions of the first switch and the second switch with thresholds, the thresholds differing in accordance with the on or off state of the first switch and the second switch.

According to the fourth aspect, because the voltages respectively detected when the first switch and the second switch are in the plural conditions are compared with the thresholds that differ in accordance with the on and off states of the first switch and the second switch, a fault may be detected more precisely.

A fifth aspect may be configured such that the processor is further configured to switch the on or off state of the first switch and the second switch into a first condition in which both the first switch and the second switch are in the off states, a second condition in which the first switch is in the off state and the second switch is in the on state, and a third condition in which both the first switch and the second switch are in the on states.

According to the fifth aspect, the on and off states of the first switch and the second switch are switched into the first condition, second condition and third condition described above, and a fault of the driving circuit is determined on the basis of voltages respectively detected in these conditions. Consequently, a fault of the driving circuit may be detected for comprehensively and efficiently.

A sixth aspect may be configured such that the processor is further configured to switch the on and off states of the first switch and the second switch into a fourth condition in which the first switch is in the on state and the second switch is in the off state.

According to the sixth aspect, the on and off states of the first switch and the second switch are switched into the fourth condition, and a fault of the driving circuit is determined using a voltage detected in the fourth condition. Hence, a location at which a fault occurs and details of the fault may be narrowed down.

A seventh aspect may be configured such that the processor is further configured to: on the basis of a voltage detected in a second condition in which the first switch is in the off state and the second switch is in the on state, determine the fault of the driving circuit in a case in which there is a short circuit to the power supply from between the first switch and the electric load; on the basis of a voltage detected in a first condition in which both the first switch and the second switch are in the off states, a third condition in which both the first switch and the second switch are in the on states, or a fourth condition in which the first switch is in the on state and the second switch is in the off state, determine the fault of the driving circuit in a case in which there is a short circuit to earth from between the first switch and the electric load; on the basis of a voltage detected in the second condition, determine the fault of the driving circuit in a case in which there is a disconnection between the first switch and the electric load; on the basis of a voltage detected in the second condition, determine the fault of the driving circuit in a case in which the first switch is stuck in the on state; and on the basis of a voltage detected in the third condition, determine the fault of the driving circuit in a case in which the first switch is stuck in the off state.

According to the seventh aspect, faults in the vicinity of the first switch—more specifically, a short circuit to the power supply from between the first switch and the electric load, a short circuit to earth from between the first switch and the electric load, a disconnection between the first switch and the electric load, the first switch being stuck in the on state, and the first switch being stuck in the off state—may be detected as faults of the driving circuit.

An eighth aspect may be configured such that the processor is further configured to: on the basis of a voltage detected in a second condition in which the first switch is in the off state and the second switch is in the on state, determine the fault of the driving circuit in a case in which there is a short circuit to the power supply from between the second switch and the electric load; on the basis of a voltage detected in a first condition in which both the first switch and the second switch are in the off states, determine the fault of the driving circuit in a case in which there is a short circuit to earth from between the second switch and the electric load; on the basis of a voltage detected in the second condition, determine the fault of the driving circuit in a case in which there is a disconnection between the second switch and the electric load; on the basis of a voltage detected in the first condition, determine the fault of the driving circuit in a case in which the second switch is stuck in the on state; and on the basis of a voltage detected in the second condition, determine the fault of the driving circuit in case in which the second switch is stuck in the off state.

According to the eighth aspect, faults in the vicinity of the second switch—more specifically, a short circuit to the power supply from between the second switch and the electric load, a short circuit to earth from between the second switch and the electric load, a disconnection between the second switch and the electric load, the second switch being stuck in the on state, and the second switch being stuck in the off state—may be detected as faults of the driving circuit.

A ninth aspect may be configured such that the processor is further configured to: determine whether the driving circuit is normal or faulty on the basis of voltages detected by the detection section plural times while the on or off state of the first switch and the second switch are in a constant condition; and determine that there is a fault of the driving circuit in a case in which the fault is determined a predetermined number of times in succession.

Immediately after on and off states of the first switch and second switch are switched, a transition condition occurs in which voltages detected by the detection section are unstable. Accordingly, in the ninth aspect, whether driving circuit is normal or faulty is determined on the basis of the voltages detected plural times. The driving circuit is determined to have a fault in a case in which determined faulty the predetermined number of times in succession. Therefore, any effect of voltage variations in the transition condition on fault detection may be suppressed.

A tenth aspect may be configured such that, in any of the preceding aspects, the electric load is a heater.

The tenth aspect may realize detection of a fault in a driving circuit that drives a heater serving as the electric load with a simple structure.

A load driving device according to an eleventh aspect includes: the fault detection device according to any of the preceding aspects; the driving circuit including the first switch and the second switch; and the detection section.

According to the eleventh aspect, because the fault detection device according to any of the first to tenth aspects is included, similarly to the first aspect, detection of a fault of the driving circuit may be realized with a simple structure.

A twelfth aspect of the present disclosure is a fault detection method for detecting a fault of a driving circuit that includes a first switch provided between an electric load and a power supply section, a second switch provided between the electric load and earth, and a detection section that detects a voltage between the first switch and the electric load, the fault detection method including: performing control to put the first switch into an on state connecting the electric load with the power supply section or an off state disconnecting the electric load from the power supply section; performing control to put the second switch into an on state connecting the electric load with earth or an off state disconnecting the electric load from earth; and determining a fault of the driving circuit on the basis of the controlled on or off state of the first switch and the second switch and a voltage detected by the detection section.

According to the twelfth aspect, similarly to the first aspect, detection of a fault of the driving circuit may be realized with a simple structure.

A thirteenth aspect of the present disclosure is a non-transitory storage medium storing a program executable by a computer to perform fault detection processing for detecting a fault of a driving circuit that includes a first switch provided between an electric load and a power supply section, a second switch provided between the electric load and earth, and a detection section that detects a voltage between the first switch and the electric load, the fault detection processing including: performing control to put the first switch into an on state connecting the electric load with the power supply section or an off state disconnecting the electric load from the power supply section; performing control to put the second switch into an on state connecting the electric load with earth or an off state disconnecting the electric load from earth; and determining a fault of the driving circuit on the basis of the controlled on or off state of the first switch and second switch and a voltage detected by the detection section.

According to the thirteenth aspect, similarly to the first aspect, detection of a fault of the driving circuit may be realized with a simple structure.

The present disclosure may realize detection of a fault of a driving circuit with a simple structure.

BRIEF DESCRIPTION OF THE DRAWINGS

FIG. 13 is a table illustrating possibilities of detection of various faults in respective conditions: both relays off, low-side relay on, and both relays on.

FIG. 18 is a table illustrating possibilities of detection of various faults in respective conditions: both relays off, high-side relay on, low-side relay on, and both relays on.

DETAILED DESCRIPTION

Below, examples of embodiments of the present disclosure are described in detail with reference to the attached drawings.

First Exemplary Embodiment

Figure 1:
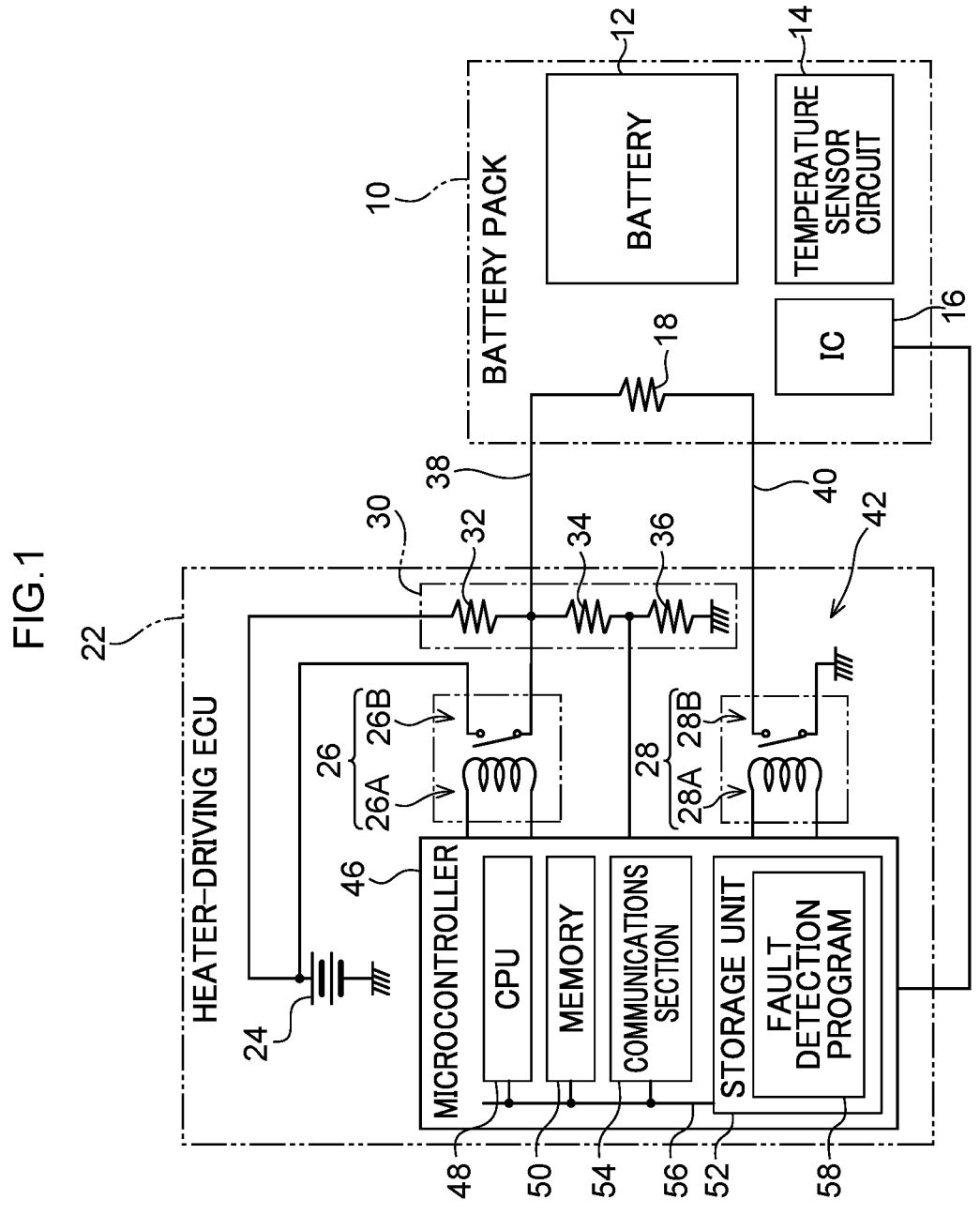
FIG. 1 is a schematic diagram illustrating a battery pack and a heater-driving ECU according to an exemplary embodiment.

FIG. 1 illustrates a battery pack 10 and a heater-driving ECU 22 that drives a heater 18 incorporated in the battery pack 10. The battery pack 10 and the heater-driving ECU 22 are installed in a vehicle (not illustrated in the drawings). The battery pack 10 and the heater-driving ECU 22 are connected by high-side connection wiring 38 and low-side connection wiring 40.

The battery pack 10 includes a battery 12, a temperature sensor circuit 14, an integrated circuit (IC) 16 and the heater 18. The temperature sensor circuit 14 detects a temperature of the battery 12. The IC 16 sends the temperature of the battery 12 detected by the temperature sensor circuit 14 to the heater-driving ECU 22. When electrified, the heater 18 heats the battery 12. The heater 18 is an example of an electric load of the present disclosure. The battery 12 of the battery pack 10 functions, for example, as a backup power supply of an auxiliary battery (not illustrated in the drawings) installed in the vehicle.

The heater-driving ECU 22 includes a power supply section 24, a first relay 26 provided between the heater 18 and the power supply section 24, a second relay 28 provided between the heater 18 and earth, a voltage sensor circuit 30 and a microcontroller 46. The first relay 26 is an example of a first switch of the present disclosure and is referred to where required as "the high-side relay 26". The second relay 28 is an example of a second switch of the present disclosure and is referred to where required as "the low-side relay 28". The heater-driving ECU 22 is an example of a load driving device of the present disclosure.

The first relay 26 includes an excitation coil 26A and a switch 26B that switches into an on or off state in accordance with an excited or non-excited state of the excitation coil 26A. Both ends of the excitation coil 26A are connected to the microcontroller 46. One end of the switch 26B is connected to a positive terminal of the power supply section 24, and the other end of the switch 26B is connected via the high-side connection wiring 38 to one end of the heater 18. The microcontroller 46 switches the excitation coil 26A into the excited or non-excited state and thus performs control to put the first relay 26 into an on state connecting the heater 18 with the power supply section 24 or an off state disconnecting the heater 18 from the power supply section 24.

The second relay 28 includes an excitation coil 28A and a switch 28B that switches into an on or off state in accordance with an excited or non-excited state of the excitation coil 28A. Both ends of the excitation coil 28A are connected to the microcontroller 46. One end of the switch 28B is connected via the low-side connection wiring 40 to the other end of the heater 18, and the other end of the switch 28B is connected to earth. The microcontroller 46 switches the excitation coil 28A into the excited or non-excited state and thus performs control to put the second relay 28 into an on state connecting the heater 18 with earth or an off state disconnecting the heater 18 from earth.

The power supply section 24, first relay 26, high-side connection wiring 38, second relay 28, low-side connection wiring 40 and earth described above are an example of a driving circuit of the heater 18 and, where required below, are collectively referred to as the driving circuit 42.

The voltage sensor circuit 30 includes resistances 32, 34 and 36. One end of the resistance 32 is connected to the positive terminal of the power supply section 24 and the other end is connected to partway along the high-side connection wiring 38. One end of the resistance 34 is connected to partway along the high-side connection wiring 38 and the other end is connected to one end of the resistance 36. The other end of the resistance 36 is connected to earth. The voltage sensor circuit 30 is connected to the microcontroller 46 at a connection point between the resistance 34 and the resistance 36. Thus, a voltage on the high-side connection wiring is divided by the resistances 34 and 36 and a divided voltage is inputted to the microcontroller 46. The voltage sensor circuit 30 is an example of a detection section, and the voltage inputted from the voltage sensor circuit 30 to the microcontroller 46 is an example of "a voltage between the first switch and the electric load".

The microcontroller 46 includes a CPU 48, memory 50 such as a ROM, RAM and the like, a nonvolatile storage unit 52 such as an HDD, SSD or the like, and a communications section 54. The CPU 48, memory 50, storage unit 52 and communications section 54 are connected to be capable of communications with one another via an internal bus 56. The microcontroller 46 determines whether or not heating of the battery 12 by the heater 18 is necessary, on the basis of a temperature of the battery 12 received from the integrated circuit of the battery pack 10. In a case in which the microcontroller 46 determines that heating of the battery 12 by the heater 18 is necessary, the microcontroller 46 electrifies the heater 18 by performing control to put each of the first relay 26 and second relay 28 into the on states thereof.

Figure 2:
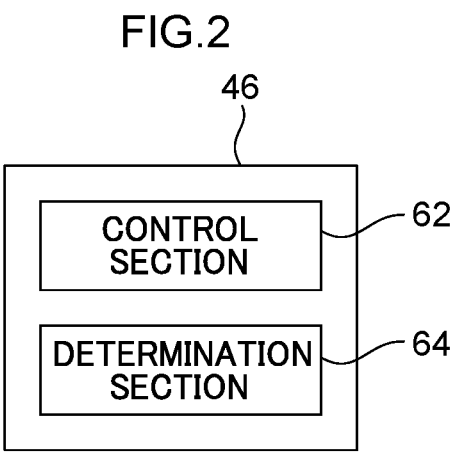
FIG. 2 is a functional block diagram of a microcontroller.

A fault detection program 58 is stored in the storage unit 52. The microcontroller 46 reads the fault detection program 58 from the storage unit 52 and loads the fault detection program 58 into the memory 50. The fault detection program 58 loaded into the memory 50 is executed by the CPU 48, for example, when an ignition switch of the vehicle is turned on and the driving circuit 42 starts up. Thus, the microcontroller 46 carries out fault detection processing, which is described below. In carrying out the fault detection processing, the microcontroller 46 functions as a control section 62 and a determination section 64, which are illustrated in FIG. 2. The microcontroller 46 is an example of a fault detection device of the present disclosure and an example of a computer of the present disclosure.

The control section 62 performs control to put the first relay 26 into the on state connecting the heater 18 with the power supply section 24 or the off state disconnecting the heater 18 from the power supply section 24, and performs control to put the second relay 28 into the on state connecting the heater 18 with earth or the off state disconnecting the heater 18 from earth.

The determination section 64 determines a fault of the driving circuit 42 on the basis of the on and off states of the first relay 26 and second relay 28 controlled by the control section 62 and of voltages detected by the voltage sensor circuit 30, which detects a voltage between the first relay 26 and the heater 18 (on the high-side connection wiring 38).

Now, operation of the first exemplary embodiment is described. The present exemplary embodiment gives consideration to the following ten types of fault as faults of the driving circuit 42.

Figure 3:
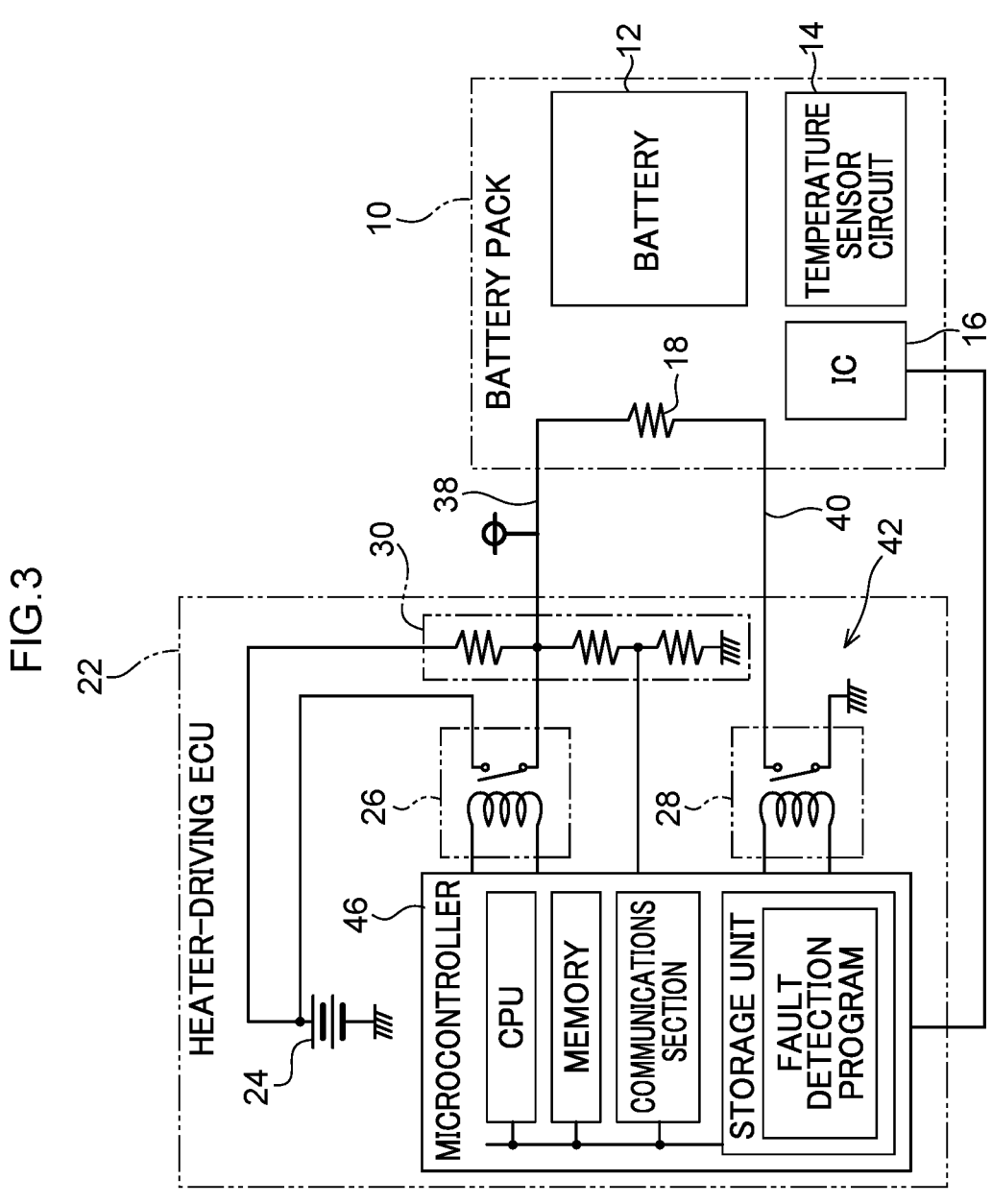
FIG. 3 is a schematic diagram depicting a situation in which a high-side +B short circuit occurs in a driving circuit.

(1) A short circuit to the power supply from between the first relay 26 and the heater 18 (see FIG. 3; below referred to as a high-side +B short circuit)

Figure 4:
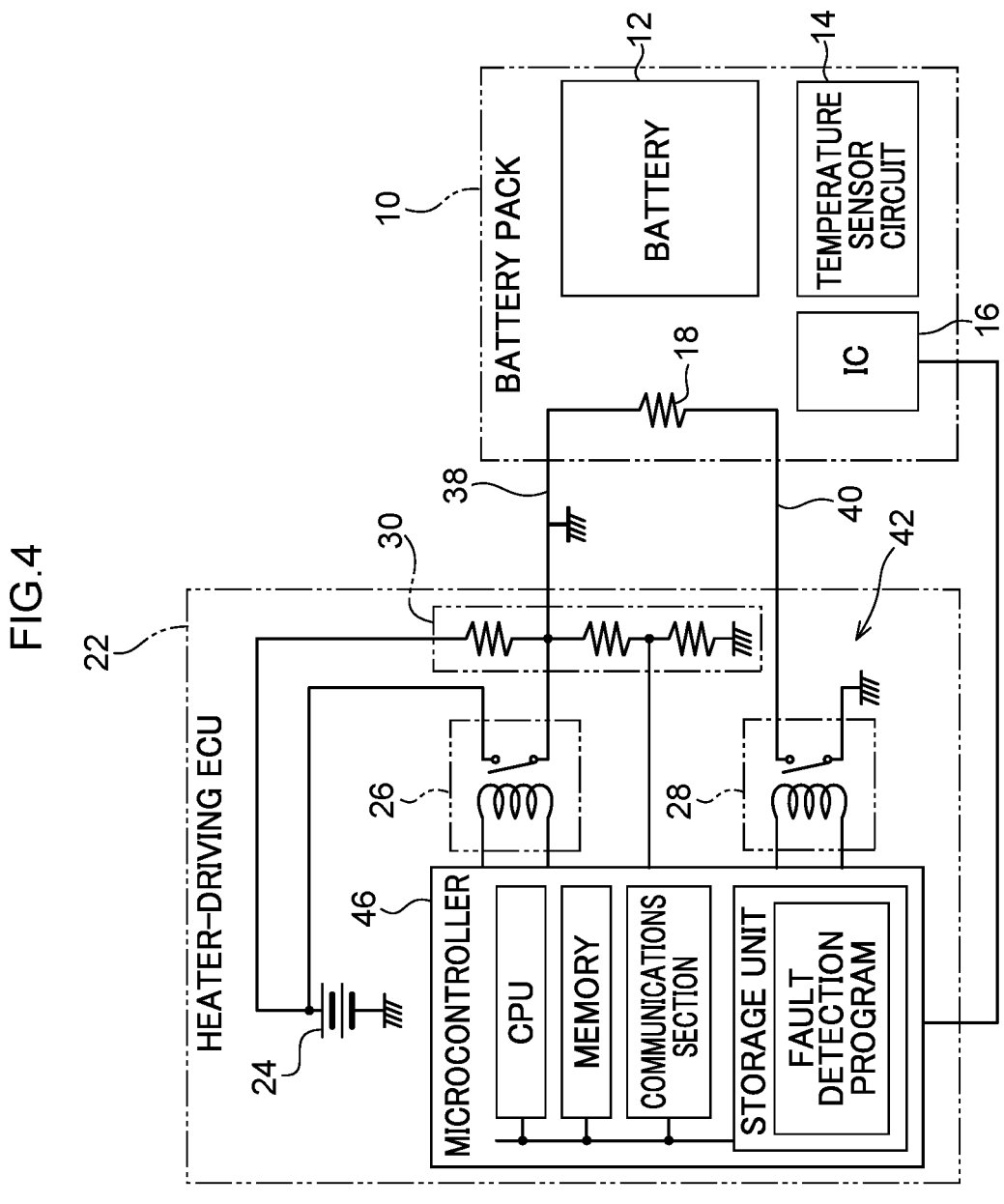
FIG. 4 is a schematic diagram depicting a situation in which a high-side GND short circuit occurs in the driving circuit.

(2) A short circuit to earth from between the first relay 26 and the heater 18 (see FIG. 4; below referred to as a high-side GND short circuit)

Figure 5:
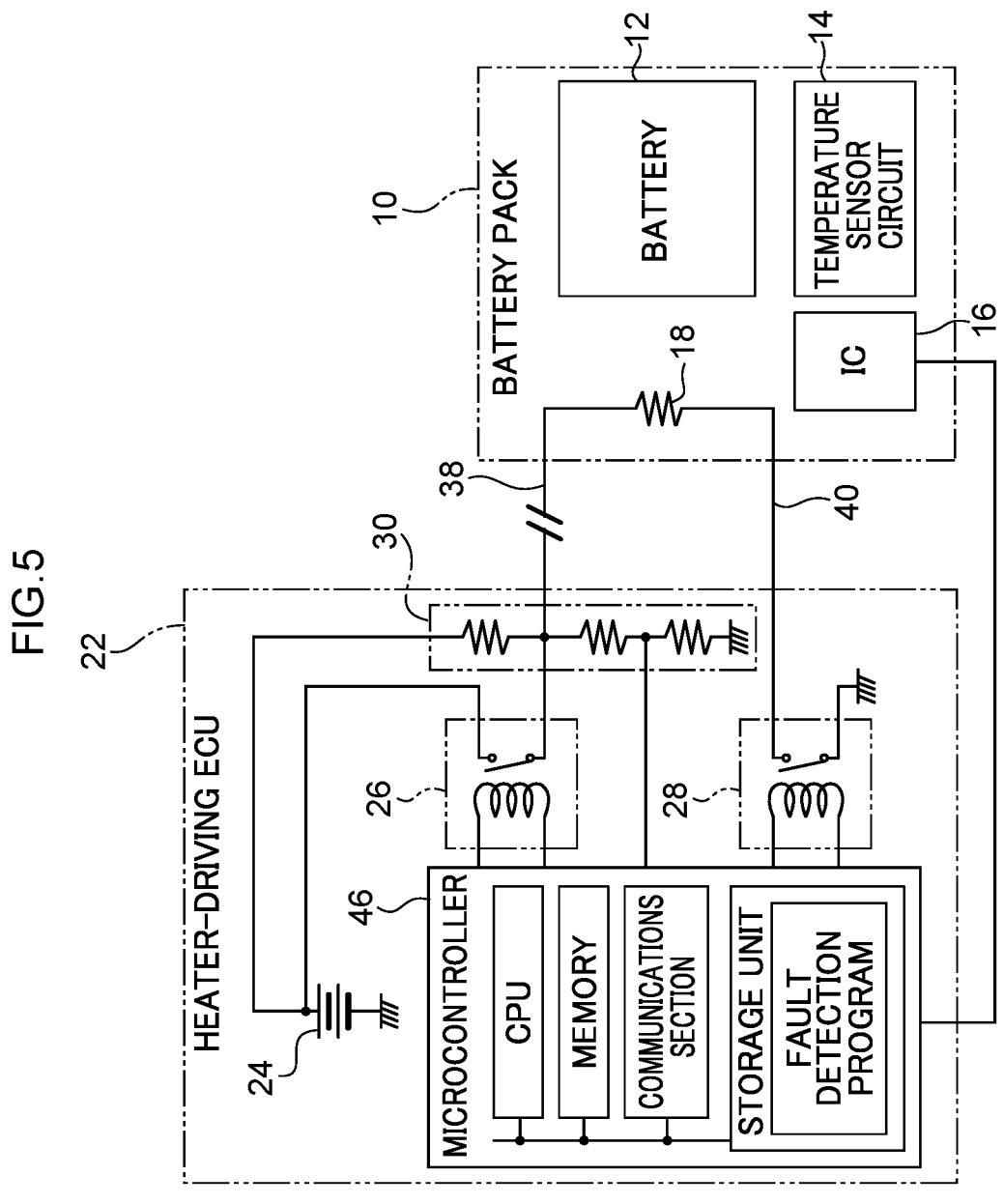
FIG. 5 is a schematic diagram depicting a situation in which a high-side open circuit occurs in the driving circuit.

(3) A disconnection between the first relay 26 and the heater 18 (see FIG. 5; below referred to as a high-side open circuit)

Figure 6:
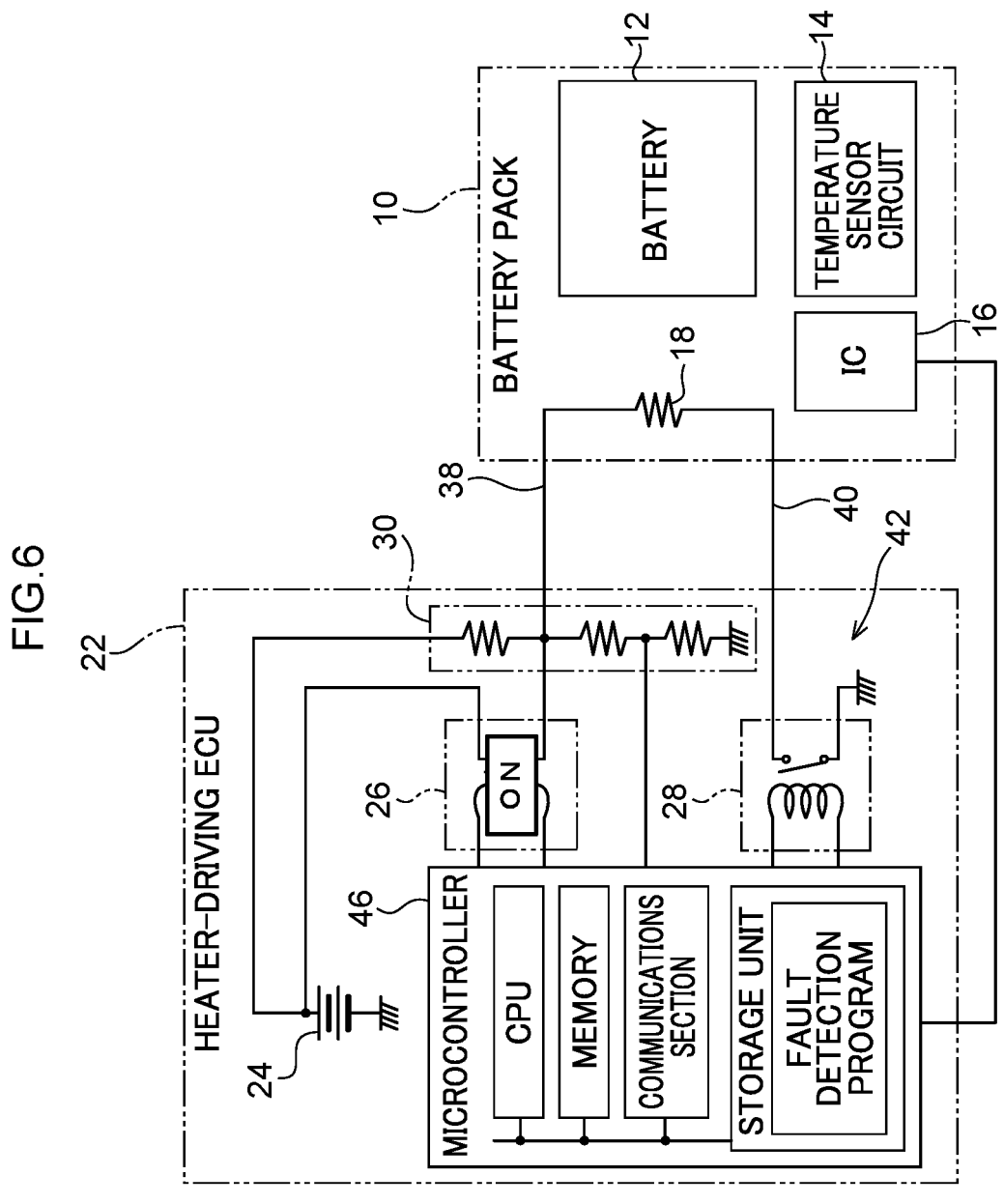
FIG. 6 is a schematic diagram depicting a situation in which high-side on-sticking occurs in the driving circuit.

(4) The first relay 26 being stuck in the on state thereof (see FIG. 6; below referred to as high-side on-sticking)

Figure 7:
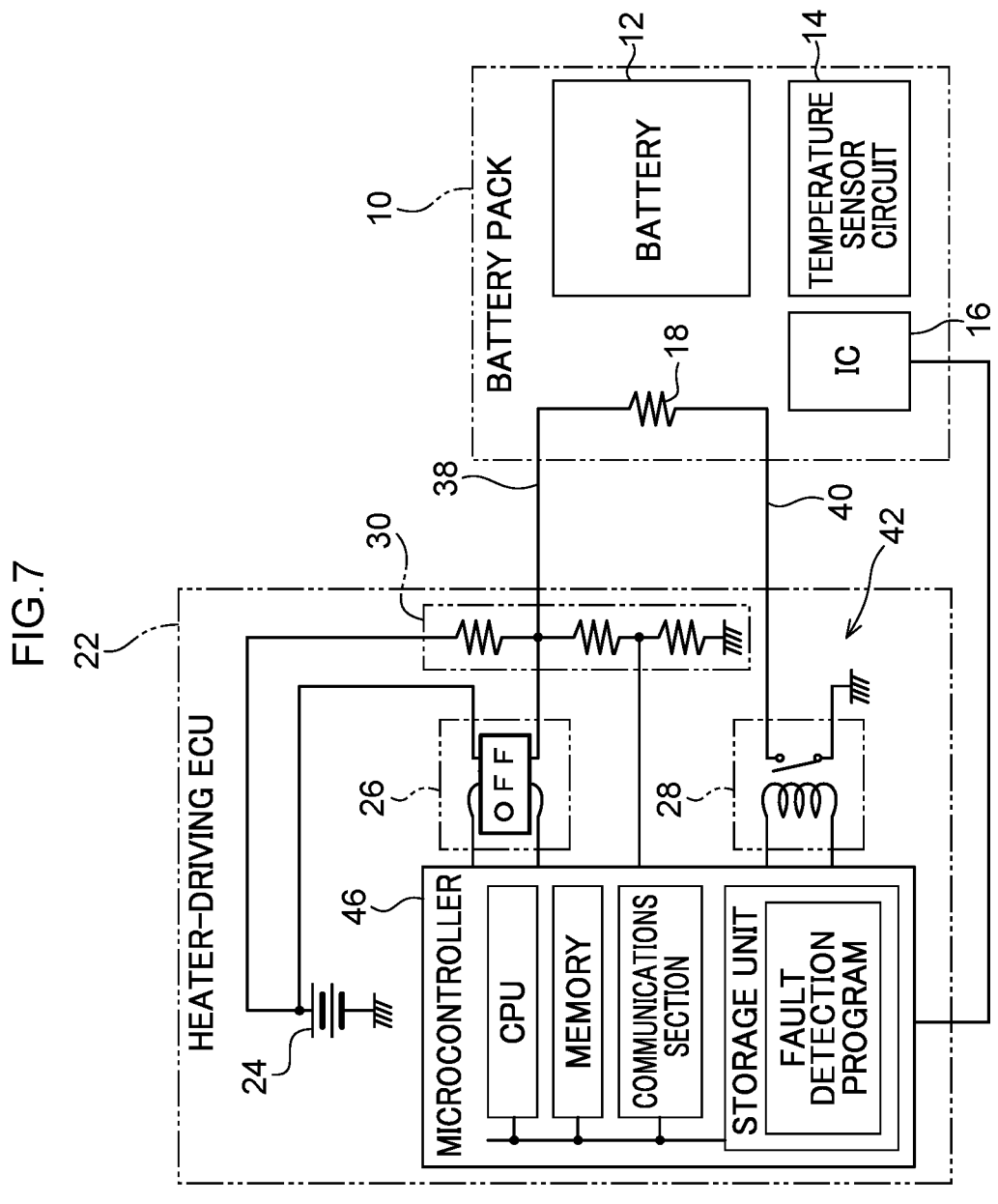
FIG. 7 is a schematic diagram depicting a situation in which high-side off-sticking occurs in the driving circuit.

(5) The first relay 26 being stuck in the off state thereof (see FIG. 7; below referred to as high-side off-sticking)

Figure 8:
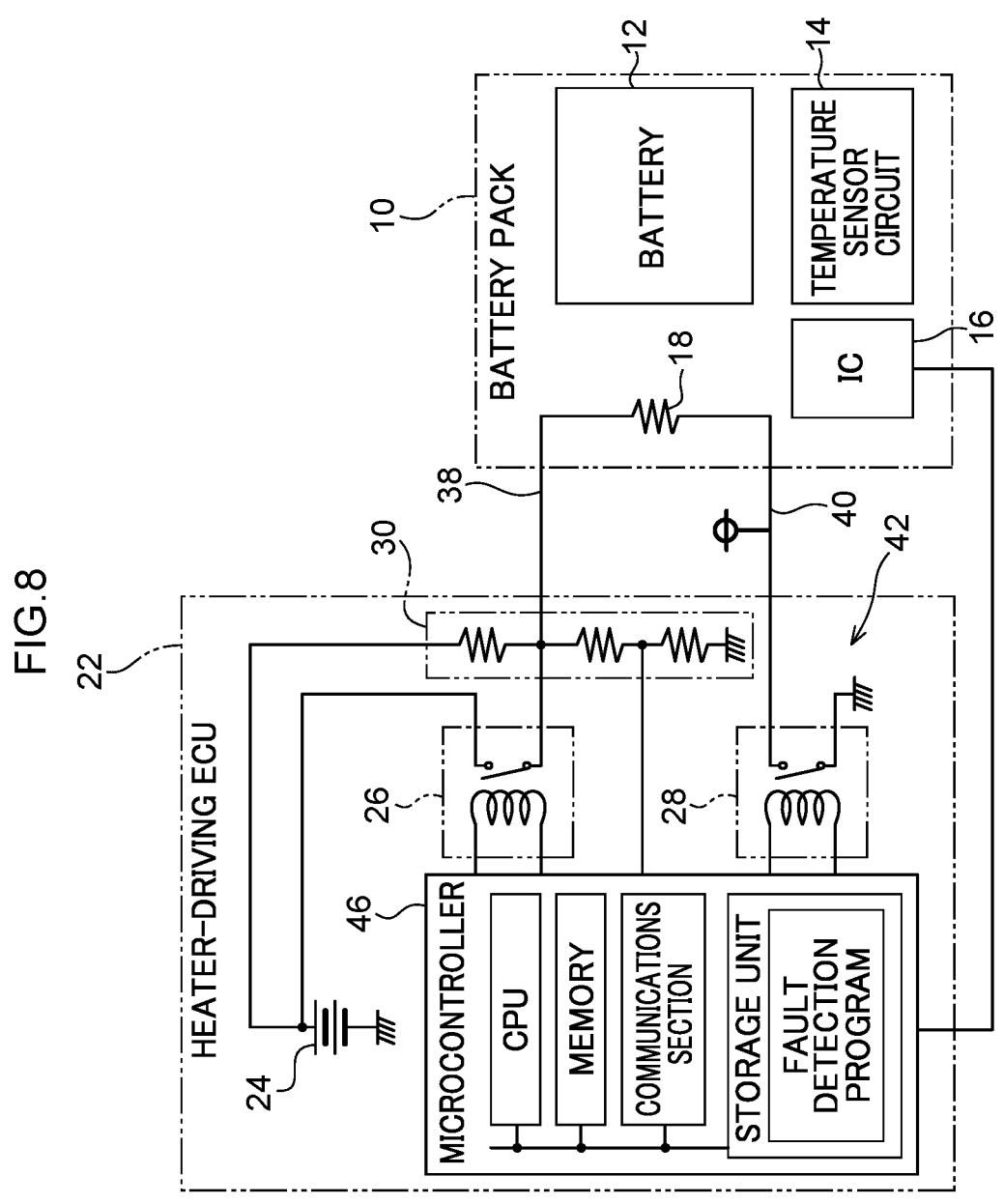
FIG. 8 is a schematic diagram depicting a situation in which a low-side +B short circuit occurs in the driving circuit.

(6) A short circuit to the power supply from between the second relay 28 and the heater 18 (see FIG. 8; below referred to as a low-side +B short circuit)

Figure 9:
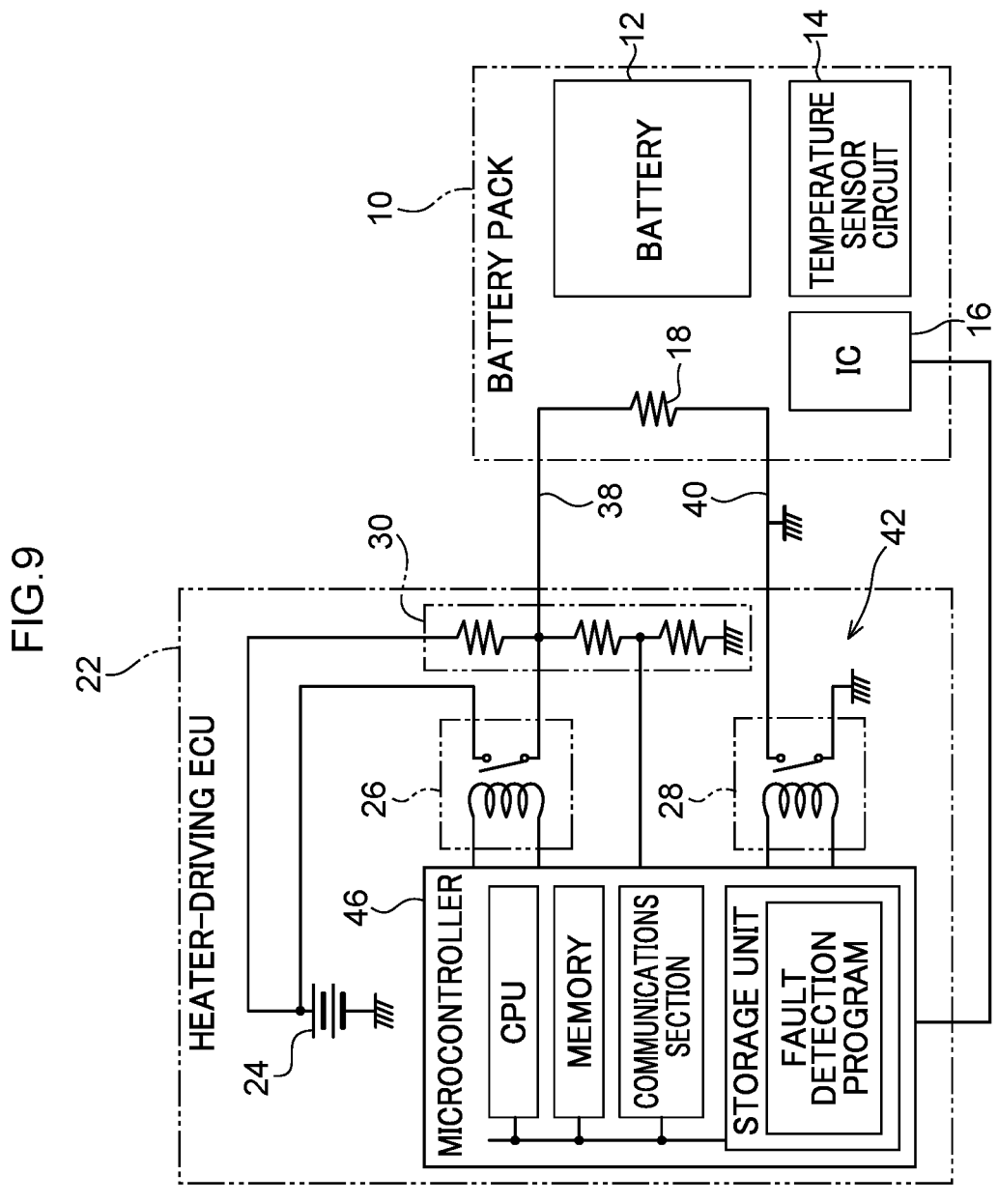
FIG. 9 is a schematic diagram depicting a situation in which a low-side GND short circuit occurs in the driving circuit.

(7) A short circuit to earth from between the second relay 28 and the heater 18 (see FIG. 9; below referred to as a low-side GND short circuit)

Figure 10:
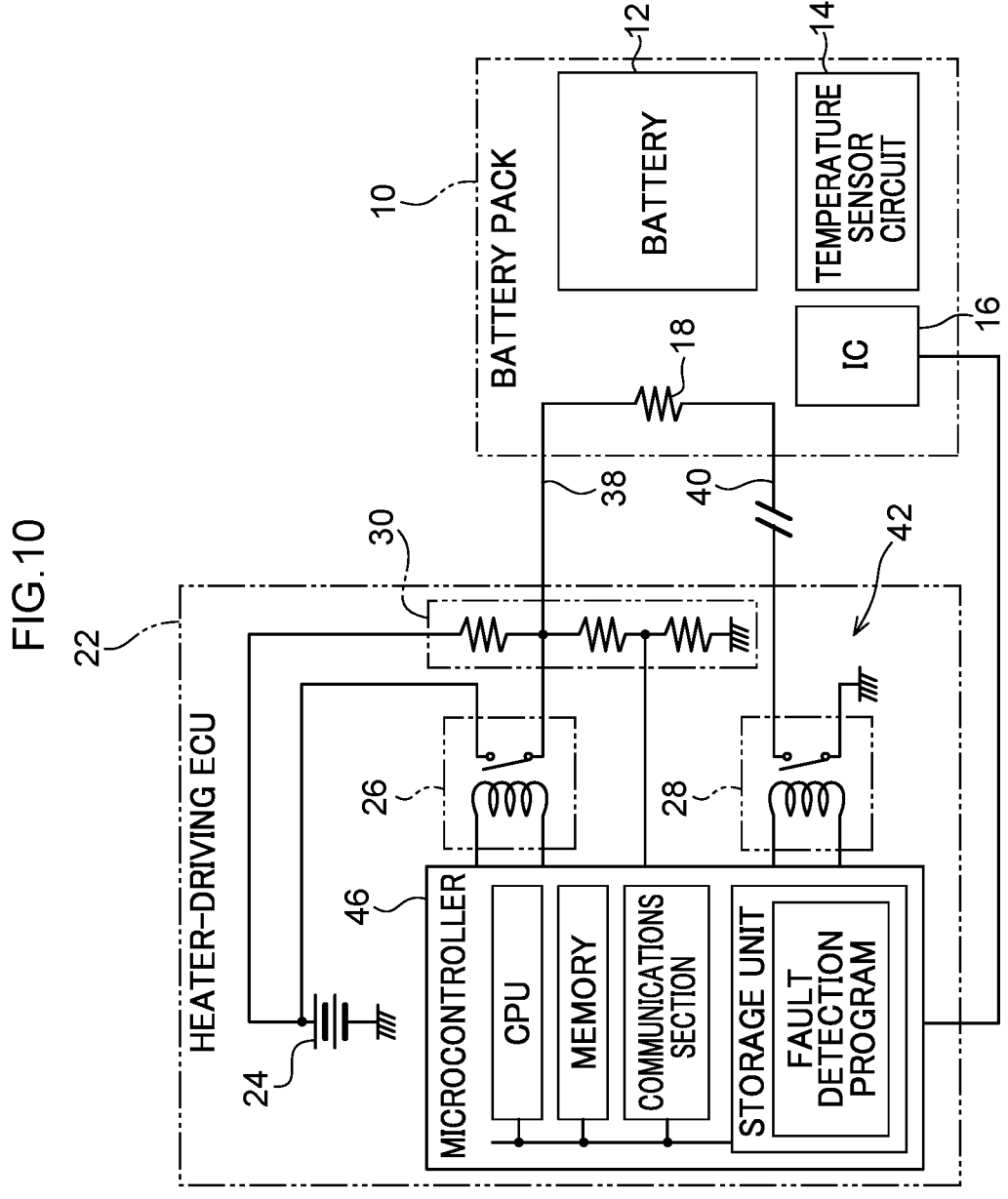
FIG. 10 is a schematic diagram depicting a situation in which a low-side open circuit occurs in the driving circuit.

(8) A disconnection between the second relay 28 and the heater 18 (see FIG. 10; below referred to as a low-side open circuit)

Figure 11:
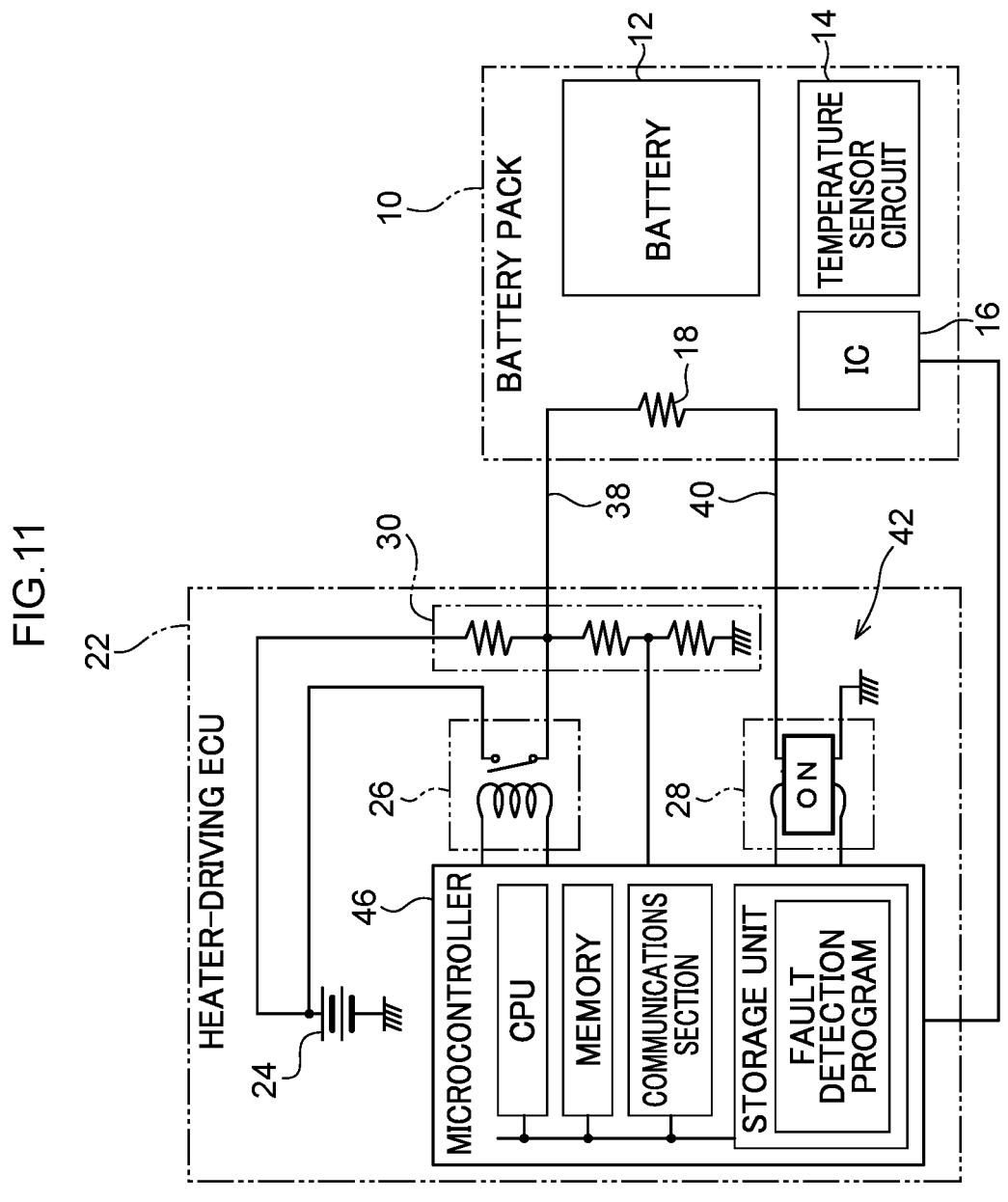
FIG. 11 is a schematic diagram depicting a situation in which low-side on-sticking occurs in the driving circuit.

(9) The second relay 28 being stuck in the on state thereof (see FIG. 11; below referred to as low-side on-sticking)

Figure 12:
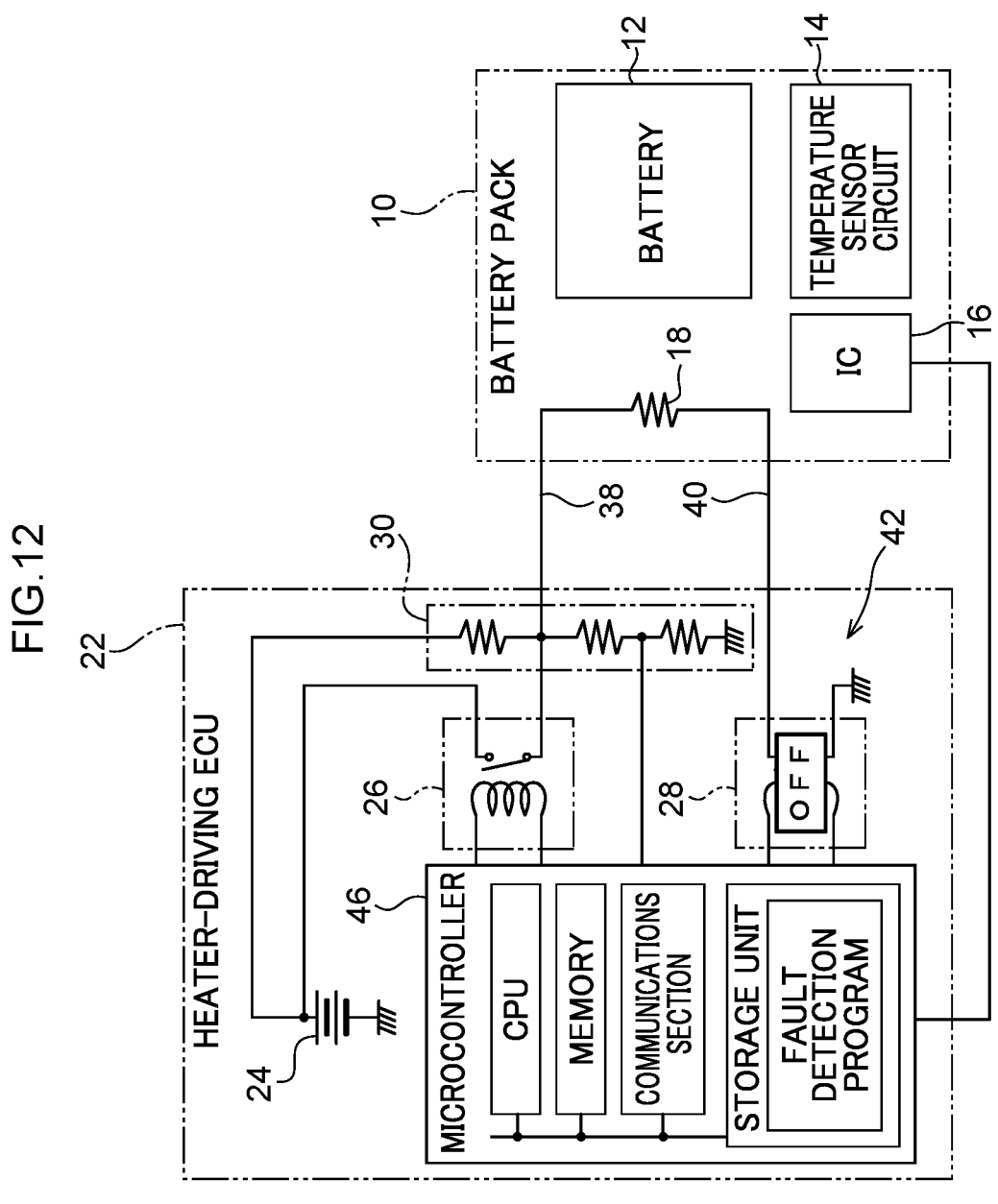
FIG. 12 is a schematic diagram depicting a situation in which low-side off-sticking occurs in the driving circuit.

(10) The second relay 28 being stuck in the off state thereof (see FIG. 12; below referred to as low-side off-sticking)

Now, a condition in which the control section 62 has switched both the first relay (the high-side relay) 26 and the second relay (the low-side relay) 28 to the off states thereof is considered (see "both relays off" in FIG. 13; this is an example of a first condition of the present disclosure). In the both relays off condition, if the driving circuit 42 is normal, then as illustrated in FIG. 13, a voltage of the high-side connection wiring 38 detected by the voltage sensor circuit 30 (an assessment voltage) is a voltage V2. In contrast, in a case in which a high-side GND short circuit, a low side GND short circuit or low-side on-sticking has occurred at the driving circuit 42, then as illustrated in FIG. 13, the assessment voltage in the both relays off condition is zero.

Accordingly, a threshold voltage for the assessment voltage in the both relays off condition is set to a value smaller than a voltage V1 and the voltage V2 but greater than zero, and the determination section 64 determines that a fault has occurred in the driving circuit 42 when the assessment voltage is lower than the threshold voltage. Thus, an occurrence of a high-side GND short circuit, a low-side GND short circuit or low side on-sticking in the driving circuit 42 may be detected.

In FIG. 13, a circle signifies that a fault may be detected, and a cross signifies that the fault cannot be detected. A triangle signifies that the fault may be detected if variations in the assessment voltage are small.

Now, a condition in which the control section 62 has switched the first relay (the high-side relay) 26 to the off state and switched the second relay (the low-side relay) 28 to the on state is considered (see "low-side relay on" in FIG.

13; this is an example of a second condition of the present disclosure). If the driving circuit 42 is normal in the low-side relay on condition, then as illustrated in FIG. 13, the assessment voltage is zero. In contrast, in a case in which a high-side +B short circuit, high-side on-sticking or a low-side +B short circuit has occurred at the driving circuit 42, then as illustrated in FIG. 13, the assessment voltage in the low-side relay on condition is V4. Alternatively, in a case in which a high-side open circuit or a low-side open circuit has occurred at the driving circuit 42, then as illustrated in FIG. 13, the assessment voltage in the low-side relay on condition is V2. In a case in which low-side off-sticking has occurred at the driving circuit 42, then as illustrated in FIG. 13, the assessment voltage in the low-side relay on condition is V1.

Accordingly, a threshold voltage for the assessment voltage in the low-side relay on condition is set to a value smaller than the voltages V1 and V2, and the determination section 64 determines that a fault has occurred in the driving circuit 42 in a case in which the assessment voltage is greater than the threshold voltage. Thus, an occurrence of a high-side +B short circuit, high-side on-sticking, a high-side open circuit, a low-side +B short circuit, a low-side open circuit or low-side off-sticking in the driving circuit 42 may be detected.

Now, a condition in which the control section 62 has switched both the first relay (the high-side relay) 26 and the second relay (the low-side relay) 28 to the on states thereof is considered (see "both relays on" in FIG. 13; this is an example of a third condition of the present disclosure). If the driving circuit 42 is normal in the both relays on condition, then as illustrated in FIG. 13, a voltage of the high-side connection wiring 38 detected by the voltage sensor circuit 30 (the assessment voltage) is a voltage V3. In contrast, in a case in which a high-side GND short circuit or high-side off-sticking has occurred at the driving circuit 42, then as illustrated in FIG. 13, the assessment voltage in the both relays on condition is zero.

Accordingly, a threshold voltage for the assessment voltage in the both relays on condition is set to a value smaller than the voltages V3 and V4 but greater than zero, and the determination section 64 determines that a fault has occurred at the driving circuit 42 in a case in which the assessment voltage is less than the threshold voltage. Thus, an occurrence of a high-side GND short circuit or high side off-sticking in the driving circuit 42 may be detected.

Thus, by the control section 62 switching the first relay 26 and the second relay 28 to each of the both relays off condition, the low-side relay on condition and the both relays on condition, and the determination section 64 comparing the assessment voltages with the threshold voltages according to the respective states, the ten types of fault of the driving circuit 42 may be detected for comprehensively.

Now, the fault detection processing according to the first exemplary embodiment is described with reference to FIG. 14. In step 100, the control section 62 makes a determination as to whether all assessments (an assessment with both relays off, an assessment with the low-side relay on, and an assessment with both relays on) are unfinished. When the result of the determination in step 100 is affirmative, the microcontroller 46 proceeds to step 102.

In step 102, the control section 62 switches the on and off states of the high-side relay 26 and low-side relay 28 for assessment. That is, the control section 62 first turns off both the high-side relay 26 and the low-side relay 28 in order to carry out the assessment with both relays off. After the assessment with both relays off is complete, the control section 62 subsequently turns the high-side relay 26 off and turns the low-side relay 28 on in order to carry out the assessment with the low-side relay on. After the assessment with the low-side relay on is complete, the control section 62 subsequently turns on both the high-side relay 26 and the low-side relay 28 in order to carry out the assessment with both relays on.

In step 104, the determination section 64 increments an assessment counter, which is reset to zero when the fault detection processing starts up. In step 106, the determination section 64 makes a determination as to whether the value of the assessment counter is less than a predetermined value. When the result of the determination in step 106 is affirmative, the microcontroller 46 proceeds to step 108. In step 108, the determination section 64 acquires an assessment voltage (monitor voltage) from the voltage sensor circuit 30.

In step 110, the determination section 64 makes a determination as to whether the assessment with both relays off is not completed and both the high-side relay 26 and the low-side relay 28 are off. The determination as to whether the assessment with both relays off is not completed is implemented by making a determination as to whether a both relays off assessment flag, which is described below, is at zero (this flag is reset to zero when the fault detection processing starts up).

When the result of the determination in step 110 is affirmative, the microcontroller 46 proceeds to step 112. In step 112, the determination section 64 carries out both relays off assessment processing, after which the microcontroller 46 proceeds to step 118. Alternatively, when the result of the determination in step 110 is negative, the microcontroller 46 skips step 112 and proceeds to step 118.

Figure 15:
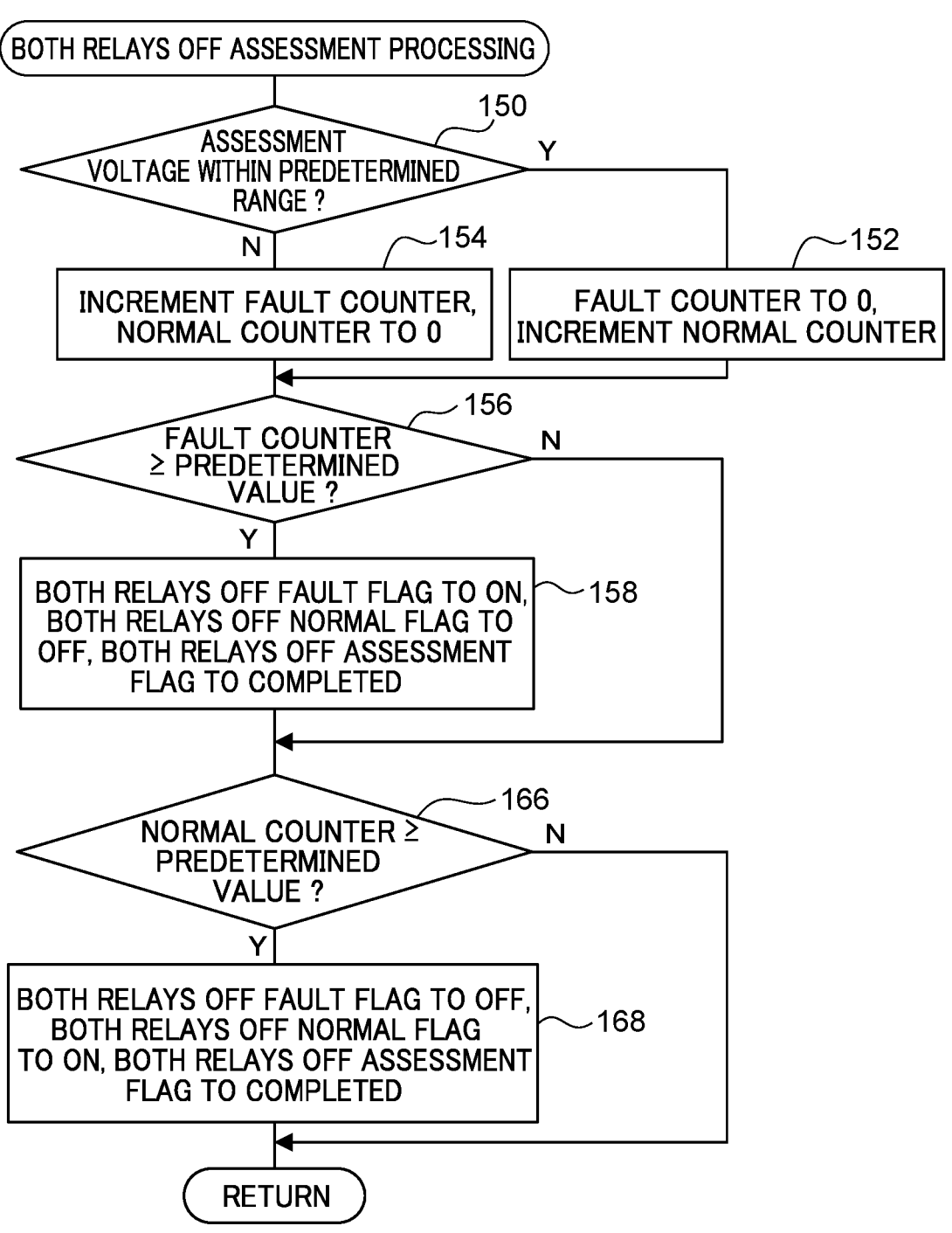
FIG. 15 is a flowchart illustrating both relays off assessment processing according to the first exemplary embodiment.

As illustrated in FIG. 15, in step 150 of this both relays off assessment processing, the determination section 64 makes a determination as to whether the assessment voltage (monitor voltage) previously acquired in step 108 is within a predetermined range in which the driving circuit 42 may be determined to be normal. A predetermined range that may be employed in the both relays off assessment processing is a range equal to and greater than a threshold voltage that is smaller than the voltages V1 and V2 but greater than zero.

When the result of the determination in step 150 is affirmative, the microcontroller 46 proceeds to step 152. In step 152, the determination section 64 resets a fault counter to zero and increments a normal counter, and the microcontroller 46 proceeds to step 156. On the other hand, when the result of the determination in step 150 is negative, the microcontroller 46 proceeds to step 154. In step 154, the determination section 64 increments the fault counter and resets the normal counter to zero, and the microcontroller 46 proceeds to step 156.

In step 156, the determination section 64 makes a determination as to whether the value of the fault counter is at least a predetermined value. When the result of the determination in step 156 is affirmative, the microcontroller 46 proceeds to step 158. In step 158, the determination section 64 sets a both relays off fault flag to (a value representing) on, sets a both relays off normal flag to (a value representing) off, and sets the both relays off assessment flag to (a value representing) "processing completed". When the result of the determination in step 156 is negative, the microcontroller 46 skips step 158.

Immediately after the on and off states of the first relay 26 and second relay 28 are switched, a transition condition occurs in which the assessment voltage is unstable. Accordingly, in steps 150 to 158, whether the driving circuit 42 is normal or faulty is determination plural times on the basis of the assessment voltages. The driving circuit 42 is determined to have a fault in a case in which determined faulty a predetermined number of times in succession. Therefore, any effect of variations in the assessment voltage in the transition condition on fault detection may be suppressed.

In step 166, the determination section 64 makes a determination as to whether the value of the normal counter is at least the predetermined value. When the result of the determination in step 166 is affirmative, the microcontroller 46 proceeds to step 168. In step 168, the determination section 64 sets the both relays off fault flag to off, sets the both relays off normal flag to on, and sets the both relays off assessment flag to "processing completed". When the result of the determination in step 166 is negative, the microcontroller 46 skips step 168.

Figure 14:
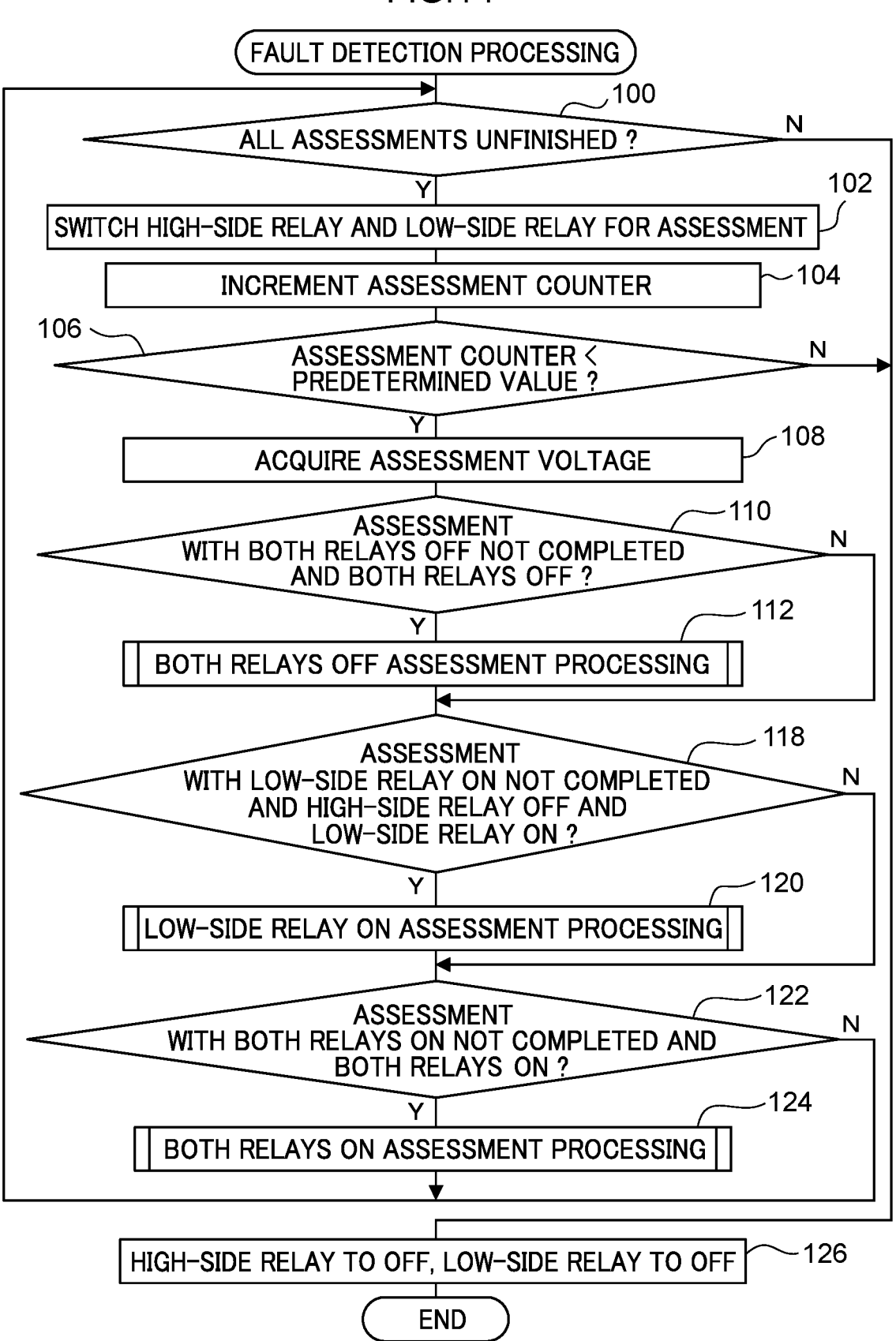
FIG. 14 is a flowchart illustrating fault detection processing according to the first exemplary embodiment.

In step 118 of FIG. 14, the determination section 64 makes a determination as to whether the assessment with the low-side relay on is not completed, the high-side relay 26 is off and the low-side relay 28 is on. The determination as to whether the assessment with the low-side relay on is not completed is implemented by making a determination as to whether a low-side relay on assessment flag, which is described below, is at zero (this flag is reset to zero when the fault detection processing starts up).

When the result of the determination in step 118 is affirmative, the microcontroller 46 proceeds to step 120. In step 120, the determination section 64 carries out low-side relay on assessment processing, after which the microcontroller 46 proceeds to step 122. Alternatively, when the result of the determination in step 118 is negative, the microcontroller 46 skips step 120 and proceeds to step 122.

Figure 16:
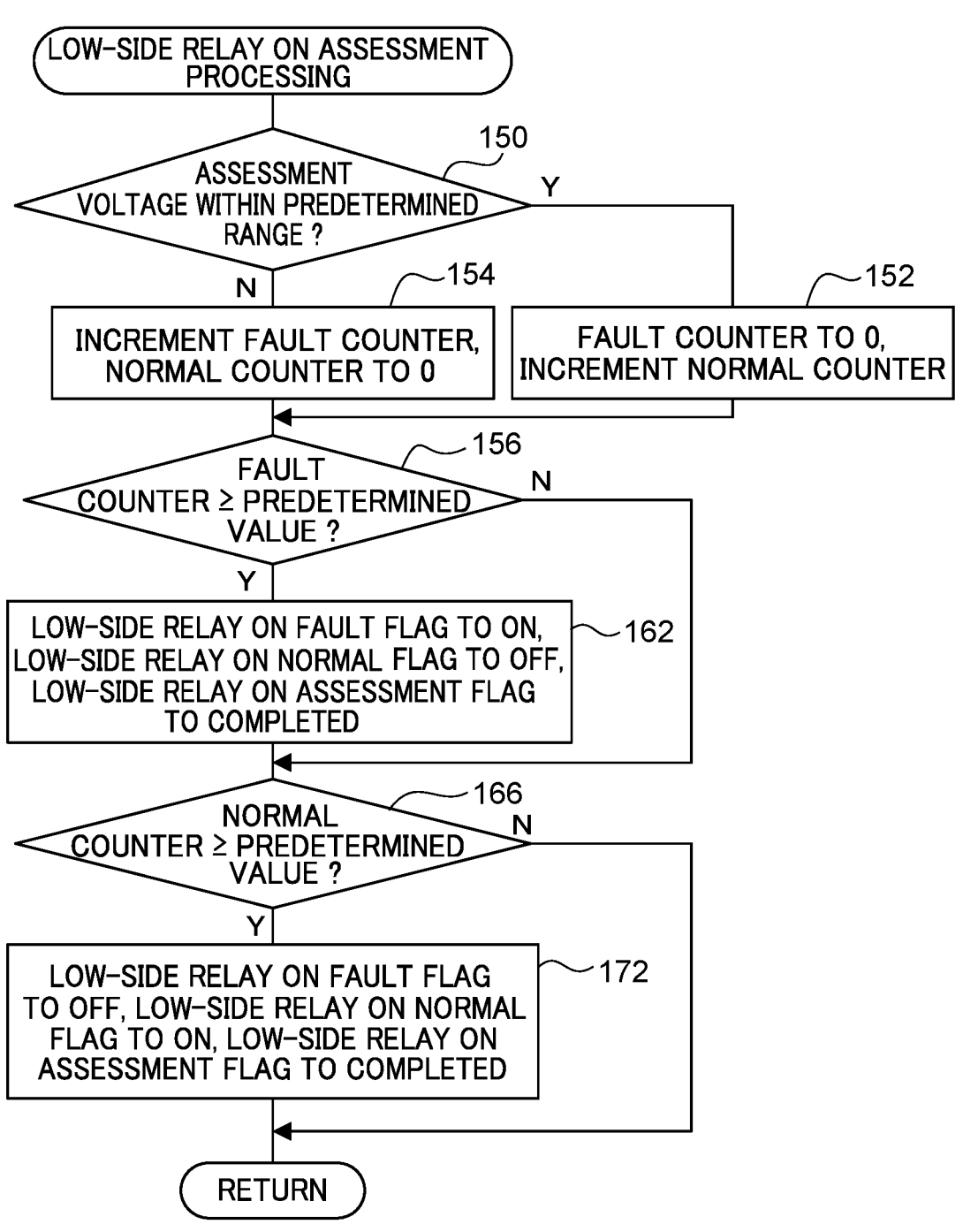
FIG. 16 is a flowchart illustrating low-side relay on assessment processing according to the first exemplary embodiment.

The low-side relay on assessment processing, principally portions thereof that differ from the both relays off assessment processing (FIG. 15), is described with reference to FIG. 16. In step 150 of the low-side relay on assessment processing, similarly to the both relays off assessment processing, the determination section 64 makes a determination as to whether the assessment voltage (monitor voltage) is within a predetermined range in which the driving circuit 42 may be determined to be normal. A predetermined range that may be employed in the low-side relay on assessment processing is a range equal to and lower than a threshold voltage that is smaller than the voltages V1 and V2.

In the low-side relay on assessment processing, when the result of the determination in step 156 is affirmative, the microcontroller 46 proceeds to step 162. In step 162, the determination section 64 sets a low-side relay on fault flag to on, sets a low-side relay on normal flag to off, and sets the low-side relay on assessment flag to "processing completed".

In the low-side relay on assessment processing, when the result of the determination in step 166 is affirmative, the microcontroller 46 proceeds to step 172. In step 172, the determination section 64 sets the low-side relay on fault flag to off, sets the low-side relay on normal flag to on, and sets the low-side relay on assessment flag to "processing completed".

In step 122 of FIG. 14, the determination section 64 makes a determination as to whether the assessment with both relays on is not completed and both the high-side relay 26 and the low-side relay 28 are on. The determination as to whether the assessment with both relays on is not completed is implemented by making a determination as to whether a both relays on assessment flag, which is described below, is at zero (this flag is reset to zero when the fault detection processing starts up).

When the result of the determination in step 122 is affirmative, the microcontroller 46 proceeds to step 124. In step 124, the determination section 64 carries out both relays on assessment processing, after which the microcontroller 46 returns to step 100. Alternatively, when the result of the determination in step 122 is negative, the microcontroller 46 skips step 124 and returns to step 100.

Figure 17:
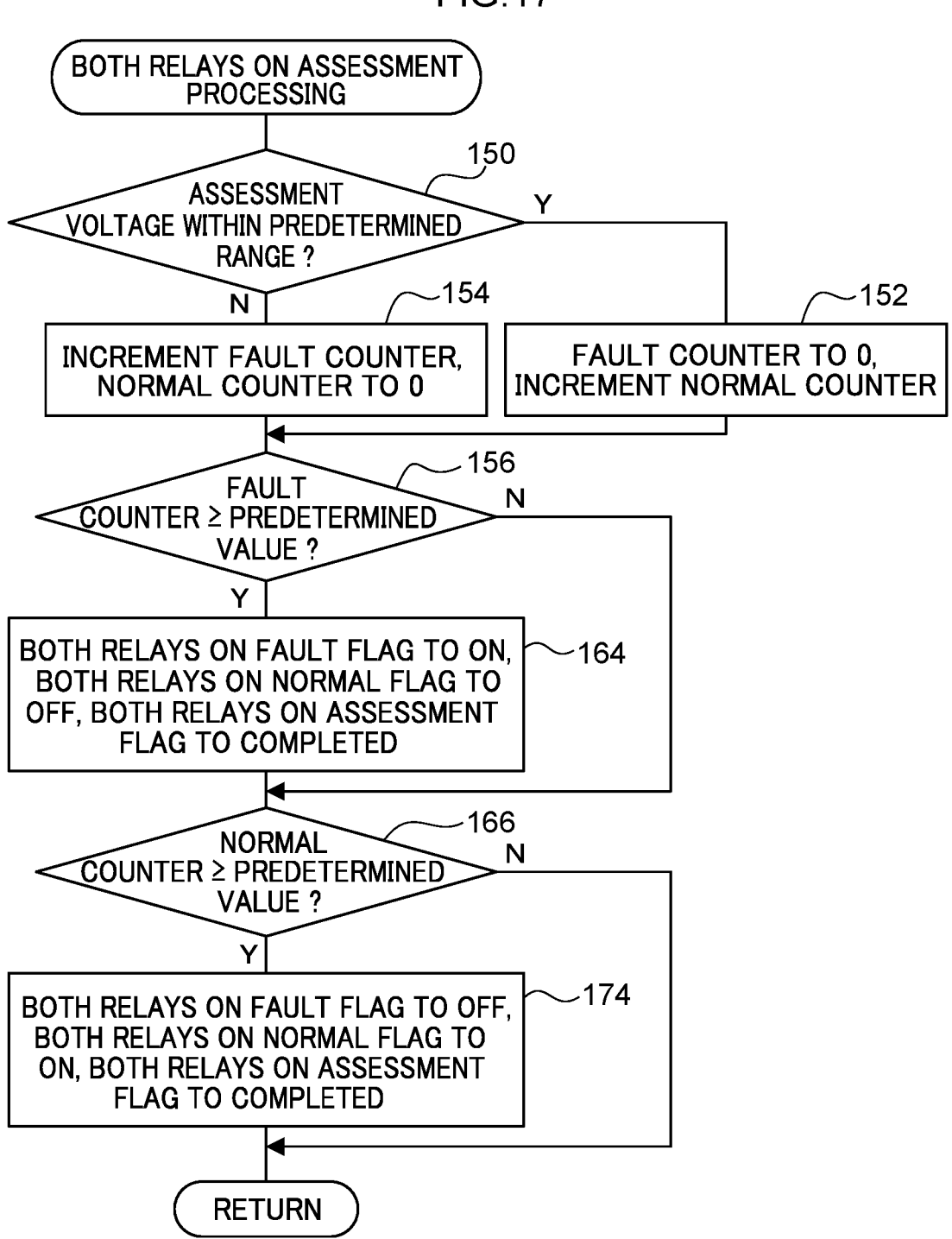
FIG. 17 is a flowchart illustrating both relays on assessment processing according to the first exemplary embodiment.

The both relays on assessment processing, principally portions thereof that differ from the both relays off assessment processing (FIG. 15), is described with reference to FIG. 17. In step 150 of the both relays on assessment processing, similarly to the both relays off assessment processing, the determination section 64 makes a determination as to whether the assessment voltage (monitor voltage) is within a predetermined range in which the driving circuit 42 may be determined to be normal. A predetermined range that may be employed in the both relays on assessment processing is a range equal to and greater than a threshold voltage that is smaller than the voltages V3 and V4 but greater than zero.

In the both relays on assessment processing, when the result of the determination in step 156 is affirmative, the microcontroller 46 proceeds to step 164. In step 164, the determination section 64 sets a both relays on fault flag to on, sets a both relays on normal flag to off, and sets the both relays on assessment flag to "processing completed".

In the both relays on assessment processing, when the result of the determination in step 166 is affirmative, the microcontroller 46 proceeds to step 174. In step 174, the determination section 64 sets the both relays on fault flag to off, sets the both relays on normal flag to on, and sets the both relays on assessment flag to "processing completed".

In FIG. 14, after all of the assessments (the assessment with both relays off, the assessment with the low-side relay on and the assessment with both relays on) are finished, the result of the determination in step 100 is negative and the microcontroller 46 proceeds to step 126. Alternatively, if the value of the assessment counter equals or exceeds the predetermined value before all of the assessments are finished, the result of the determination in step 106 is negative and the microcontroller 46 proceeds to step 126. In step 126, the control section 62 turns off both the high-side relay 26 and the low-side relay 28, and the fault detection processing ends.

When the result of the determination in step 106 is negative, this may illustrate a situation such that the assessment voltage repeatedly flips between normal and faulty, for example, with a fault that does not fall under any of the ten types of fault of the driving circuit 42 described above and with which an operational condition of the heater 18 cannot be determined. The predetermined value for the determination in step 106 may be set to a duration (for example, 8 seconds) that is at least a duration in which all of the assessments—the assessment with both relays off, the assessment with the low-side relay on and the assessment with both relays on—are finished but less than a duration in which use of the heater 18 should be started after the driving circuit 42 starts up (for example, 10 seconds).

In the fault detection processing according to the first exemplary embodiment described above, the both relays off fault flag is turned on if a fault arises in the assessment with both relays off, the low-side relay on fault flag is turned on if a fault arises in the assessment with the low-side relay on, and the both relays on fault flag is turned on if a fault arises in the assessment with both relays on. Therefore, the driving circuit 42 is determined to have a fault in a case in which one or more of the both relays off fault flag, the low-side relay on fault flag and the both relays on fault flag is on, and the ten types of fault of the driving circuit 42 may be detected for comprehensively.

On the other hand, in a case in which the both relays off fault flag, the low-side relay on fault flag and the both relays on fault flag are all off and the both relays off assessment flag, the low-side relay on assessment flag and the both relays on assessment flag are all set to "processing completed", the driving circuit 42 may be determined to be normal.

Thus, in the first exemplary embodiment, at the driving circuit 42 that includes the first relay 26 provided between the heater 18 and the power supply section 24 and the second relay 28 provided between the heater 18 and earth, the control section 62 performs control to put the first relay 26 into the on state connecting the heater 18 with the power supply section 24 or the off state disconnecting the heater 18 from the power supply section 24 and performs control to put the second relay 28 into the on state connecting the heater 18 with earth or the off state disconnecting the heater 18 from earth. The determination section 64 determines a fault of the driving circuit 42 on the basis of the on and off states of the first relay 26 and second relay 28 controlled by the control section 62 and the assessment voltages detected by the voltage sensor circuit 30 that detects the voltage between the first relay 26 and the heater 18. Therefore, there is no need to acquire voltages and currents at plural locations of the driving circuit 42 when determining a fault of the driving circuit 42, and detection of a fault of the driving circuit 42 may be realized with a simple structure.

In the first exemplary embodiment, the control section 62 successively switches the first relay 26 and the second relay 28 into plural conditions that differ from one another in the on and off states of the first relay 26 and second relay 28. The determination section 64 determines a fault of the driving circuit 42 on the basis of the on and off states of the first relay 26 and second relay 28 in each of the plural conditions and the assessment voltages respectively detected by the voltage sensor circuit 30 in the plural conditions. Therefore, a fault of the driving circuit 42 may be detected for comprehensively.

In the first exemplary embodiment, the control section 62 controls on and off states of the first relay 26 and the second relay 28 at a time of start-up of the driving circuit 42, and the determination section 64 determines a fault of the driving circuit 42 on the basis of the on and off states of the first relay 26 and second relay 28 controlled by the control section 62 at the time of start-up of the driving circuit 42 and the assessment voltages detected by the voltage sensor circuit 30. This may contribute to the driving circuit 42 driving the heater 18 promptly in a case in which the driving circuit 42 has been determined that there is no fault.

In the first exemplary embodiment, the control section 62 successively switches the first relay 26 and the second relay 28 into plural conditions that differ from one another in the on and off states of the first relay 26 and second relay 28. The determination section 64 determines a fault of the driving circuit 42 by comparing the assessment voltages respectively detected by the voltage sensor circuit 30 in the plural conditions of the first relay 26 and second relay 28 with thresholds that differ in accordance with the on and off states of the first relay 26 and second relay 28. Therefore, a fault may be detected more precisely.

In the first exemplary embodiment, the control section 62 switches the on and off states of the first relay 26 and the second relay 28 into a first condition (both relays off) in which both the first relay 26 and the second relay 28 are in the off states, a second condition (low-side relay on) in which the first relay 26 is in the off state and the second relay 28 is in the on state, and a third condition (both relays on) in which both the first relay 26 and the second relay 28 are in the on states. Consequently, a fault of the driving circuit 42 may be detected for comprehensively and efficiently.

In the first exemplary embodiment, on the basis of an assessment voltage detected in the second condition (low-side relay on), the determination section 64 determines the fault of the driving circuit 42 in a case in which a high-side +B short circuit occurs. On the basis of an assessment voltage detected in the first condition (both relays off) or the third condition (both relays on), the determination section 64 determines the fault of the driving circuit 42 in a case in which a high-side GND short circuit occurs. On the basis of an assessment voltage detected in the second condition, the determination section 64 determines the fault of the driving circuit 42 in a case in which a high-side open circuit occurs. On the basis of an assessment voltage detected in the second condition, the determination section 64 determines the fault of the driving circuit 42 in a case in which high-side on-sticking occurs. On the basis of an assessment voltage detected in the third condition, the determination section 64 determines the fault of the driving circuit 42 in a case in which high-side off-sticking occurs. Therefore, faults in the vicinity of the first relay 26 may be detected as faults of the driving circuit 42.

In the first exemplary embodiment, on the basis of an assessment voltage detected in the second condition (low-side relay on), the determination section 64 determines the fault of the driving circuit 42 in a case in which a low-side +B short circuit occurs. On the basis of an assessment voltage detected in the first condition (both relays off), the determination section 64 determines the fault of the driving circuit 42 in a case in which a low-side GND short circuit occurs. On the basis of an assessment voltage detected in the second condition, the determination section 64 determines the fault of the driving circuit 42 in a case in which a low-side open circuit occurs. On the basis of an assessment voltage detected in the first condition, the determination section 64 determines the fault of the driving circuit 42 in a case in which low-side on-sticking occurs. On the basis of an assessment voltage detected in the second condition, the determination section 64 determines the fault of the driving circuit 42 in a case in which low-side off-sticking occurs. Therefore, faults in the vicinity of the second relay 28 may be detected as faults of the driving circuit 42.

In the first exemplary embodiment, the determination section 64 determines whether the driving circuit 42 is normal or faulty on the basis of the assessment voltages detected by the voltage sensor circuit 30 a plural number of times while the on and off states of the first relay 26 and the second relay 28 are in a constant condition, and the determination section 64 determines that there is a fault of the driving circuit in a case in which a fault is determined a predetermined number of times in succession. Therefore, any effect on fault detection of voltage variations in a transition condition just after the on and off states of the first relay 26 and second relay 28 are switched may be suppressed.

Second Exemplary Embodiment

Now, a second exemplary embodiment of the present disclosure is described. Structures of the second exemplary embodiment are the same as in the first exemplary embodiment. Therefore, the same reference symbols are assigned to the respective sections and descriptions of the structures are not given. Below, portions of operations of the second exemplary embodiment that differ from the first exemplary embodiment are described.

In the first exemplary embodiment, a mode is described in which the control section 62 switches the first relay 26 and the second relay 28 into three conditions: both relays off, low-side relay on and both relays on. In the second exemplary embodiment, in addition to the three conditions mentioned above, the control section 62 switches the first relay 26 and second relay 28 into a "high-side relay on" condition in which the first relay 26 is in the on state and the second relay 28 is in the off state (see FIG. 18; this is an example of a fourth condition of the present disclosure).

When the control section 62 switches the first relay 26 and second relay 28 into the high-side relay on condition, if the driving circuit 42 is normal, the assessment voltage is V4 as illustrated in FIG. 18. In contrast, in a case in which a high-side GND short circuit has occurred at the driving circuit 42, then as illustrated in FIG. 18, the assessment voltage in the high-side relay on condition is zero. Accordingly, a threshold voltage for the assessment voltage in the high-side relay on condition is set to a value smaller than the voltages V3 and V4, and the determination section 64 determines that a fault has occurred at the driving circuit 42 in a case in which the assessment voltage is equal to or lower than the threshold voltage. Thus, an occurrence of a high-side GND short circuit in the driving circuit 42 may be detected.

Figure 19:
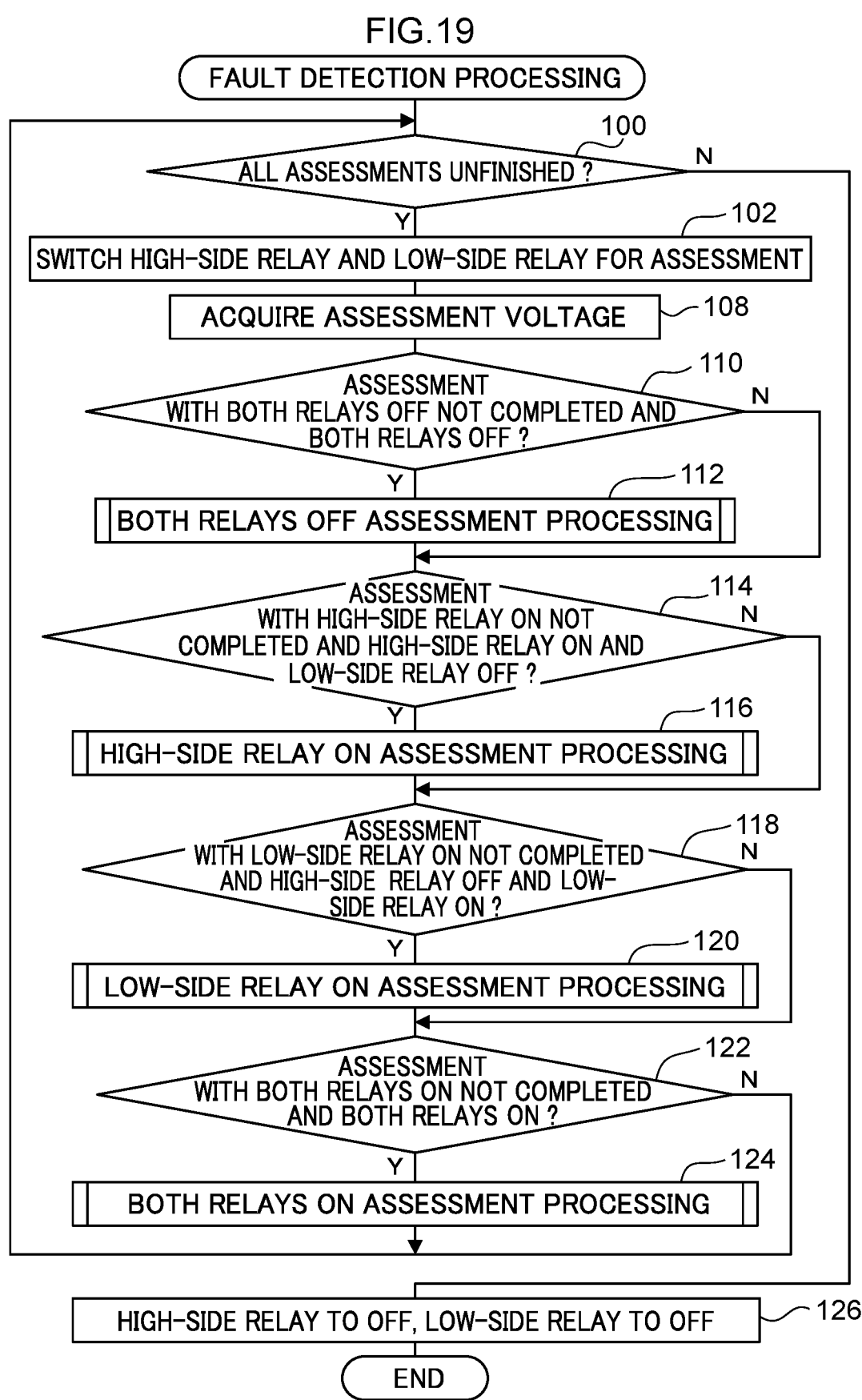
FIG. 19 is a flowchart illustrating fault detection processing according to a second exemplary embodiment.

Now, the fault detection processing according to the second exemplary embodiment is described with reference to FIG. 19. In step 102 of the fault detection processing according to the second exemplary embodiment, the first relay 26 and the second relay 28 are successively switched into the four conditions, both relays off, high-side relay on, low-side relay on and both relays on. The fault detection processing according to the second exemplary embodiment omits the processing to increment the assessment counter and compare the assessment counter with a predetermined value (steps 104 and 106). In the fault detection processing according to the second exemplary embodiment, in a case in which the both relays off assessment processing in step 112 has been carried out or the result of the determination in step 110 is negative, the microcontroller 46 proceeds to step 114.

In step 114, the determination section 64 makes a determination as to whether an assessment with the high-side relay on is not completed, the first relay 26 is on and the second relay 28 is off. The determination as to whether the assessment with the high-side relay on is not completed is implemented by making a determination as to whether a high-side relay on assessment flag, which is described below, is at zero (this flag is reset to zero when the fault detection processing starts up).

When the result of the determination in step 114 is affirmative, the microcontroller 46 proceeds to step 116. In step 116, the determination section 64 carries out high-side relay on assessment processing, after which the microcontroller 46 proceeds to step 118. Alternatively, when the result of the determination in step 114 is negative, the microcontroller 46 skips step 116 and proceeds to step 118.

Figure 20:
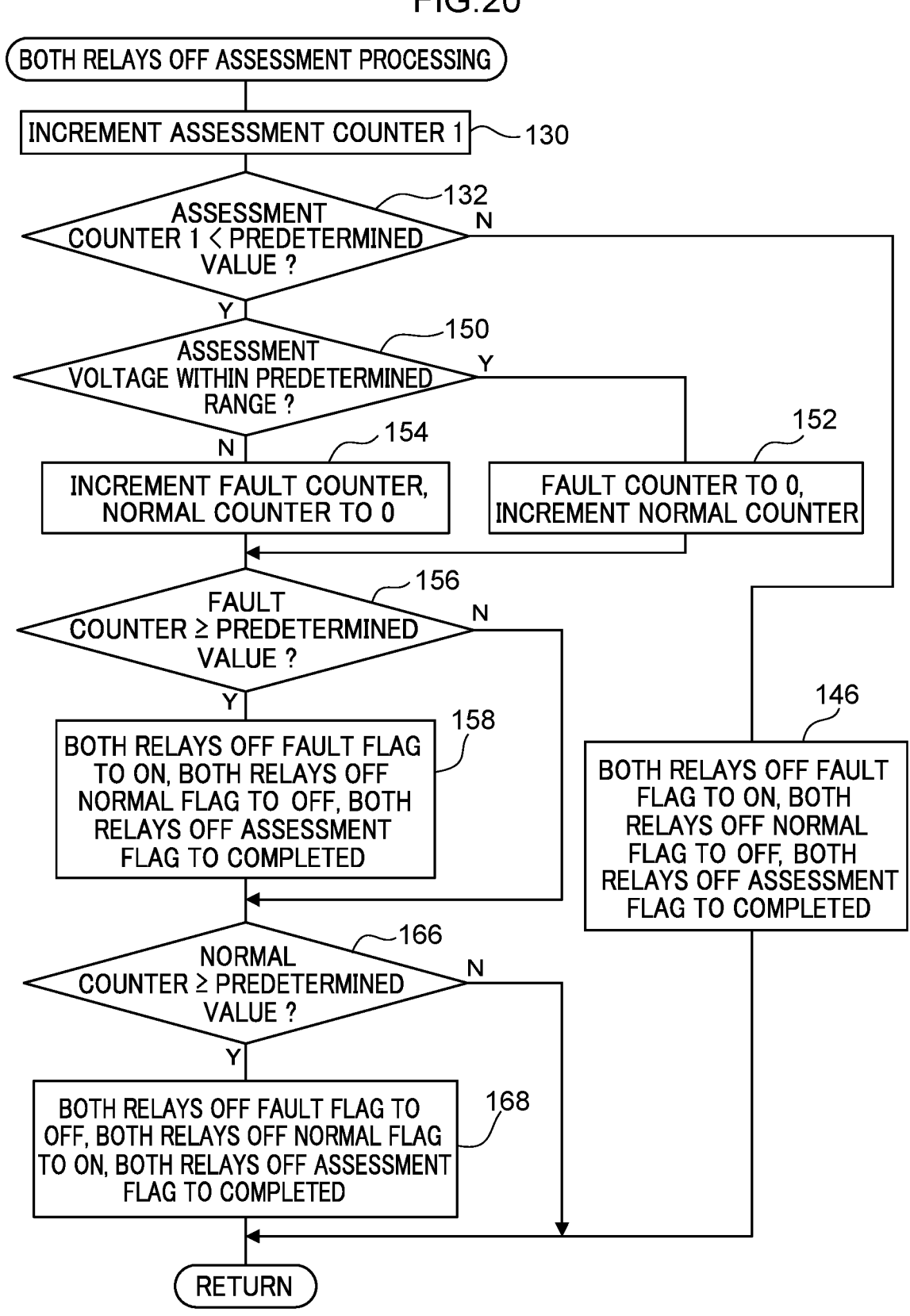
FIG. 20 is a flowchart illustrating both relays off assessment processing according to the second exemplary embodiment.

Now, portions of the both relays off assessment processing according to the second exemplary embodiment that differ from the corresponding processing described in the first exemplary embodiment (FIG. 15) are described with reference to FIG. 20. In step 130 of the both relays off assessment processing according to the second exemplary embodiment, the determination section 64 increments an assessment counter 1 for the assessment with both relays off. In step 132, the determination section 64 makes a determination as to whether the assessment counter 1 is less than a predetermined value. This predetermined value may be set to, for example, a duration that is at least a duration in which the both relays off assessment processing is completed at normal times. When the result of the determination in step 132 is affirmative, the microcontroller 46 proceeds to step 150. The processing from step 150 onward is the same as in the first exemplary embodiment (FIG. 15).

When the assessment counter 1 is at least the predetermined value, the result of the determination in step 132 is negative and the microcontroller 46 proceeds to step 146. In step 146, the determination section 64 sets the both relays off fault flag to on, sets the both relays off normal flag to off, sets the both relays off assessment flag to "processing completed", and ends the both relays off assessment processing. Hence, if the both relays off fault flag is on after the end of the fault detection processing, the microcontroller 46 may determine, on the basis of whether or not the assessment counter 1 is at least the predetermined value, whether or not a fault has occurred such that the assessment voltage repeatedly flips between normal and faulty during the execution of the both relays off assessment processing.

Figure 21:
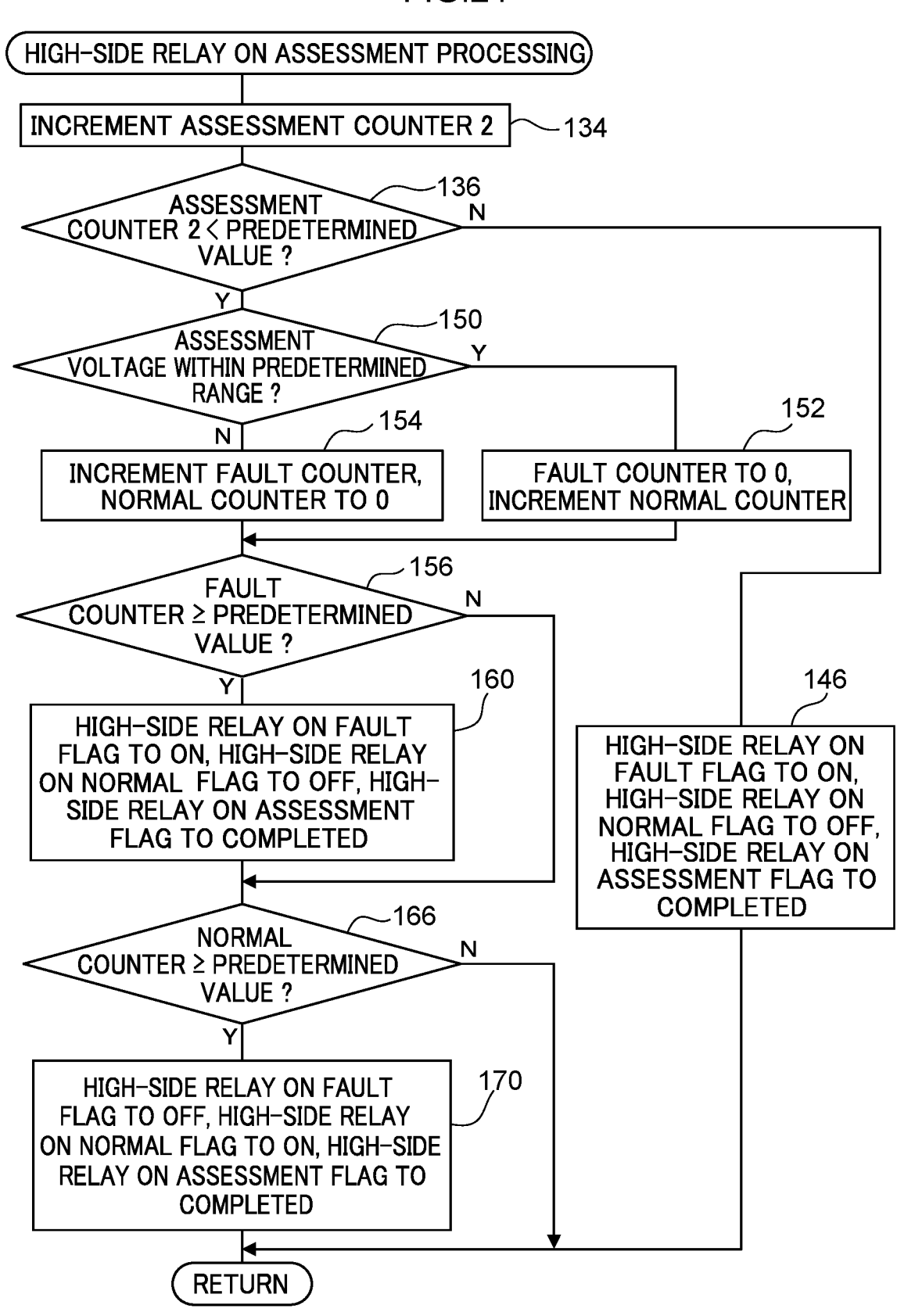
FIG. 21 is a flowchart illustrating high-side relay on assessment processing according to the second exemplary embodiment.

Now, the high-side relay on assessment processing according to the second exemplary embodiment is described with reference to FIG. 21. In step 134 of the high-side relay on assessment processing, the determination section 64 increments an assessment counter 2 for the assessment with the high-side relay on. In step 136, the determination section 64 makes a determination as to whether the assessment counter 2 is less than a predetermined value. This predetermined value may be set to, for example, a duration that is at least a duration in which the high-side relay on assessment processing is completed at normal times. When the result of the determination in step 136 is affirmative, the microcontroller 46 proceeds to step 150.

In regard to step 150 onward, portions that differ from the both relays off assessment processing (FIG. 20) are principally described. In step 150 of the high-side relay on assessment processing, similarly to the both relays off assessment processing, the determination section 64 makes a determination as to whether the assessment voltage is within a predetermined range in which the driving circuit 42 may be determined to be normal. A predetermined range that may be employed as this predetermined range in the high-side relay on assessment processing is a range equal to and lower than a threshold voltage that is smaller than the voltages V3 and V4.

In the high-side relay on assessment processing, when the result of the determination in step 156 is affirmative, the microcontroller 46 proceeds to step 160. In step 160, the determination section 64 sets a high-side relay on fault flag to on, sets a high-side relay on normal flag to off, and sets the high-side relay on assessment flag to "processing completed".

In the high-side relay on assessment processing, when the result of the determination in step 166 is affirmative, the microcontroller 46 proceeds to step 170. In step 170, the determination section 64 sets the high-side relay on fault flag to off, sets the high-side relay on normal flag to on, and sets the high-side relay on assessment flag to "processing completed".

When the assessment counter 2 is at least the predetermined value, the result of the determination in step 136 is negative and the microcontroller 46 proceeds to step 146. In step 146, the determination section 64 sets the high-side relay on fault flag to on, sets the high-side relay on normal flag to off, sets the high-side relay on assessment flag to "processing completed", and ends the high-side relay on assessment processing. Hence, if the high-side relay on assessment flag is on after the end of the fault detection processing, the microcontroller 46 may determine, on the basis of whether the assessment counter 2 is at least the predetermined value, whether or not a fault has occurred such that the assessment voltage repeatedly flips between normal and faulty during the execution of the high-side relay on assessment processing.

Figure 22:
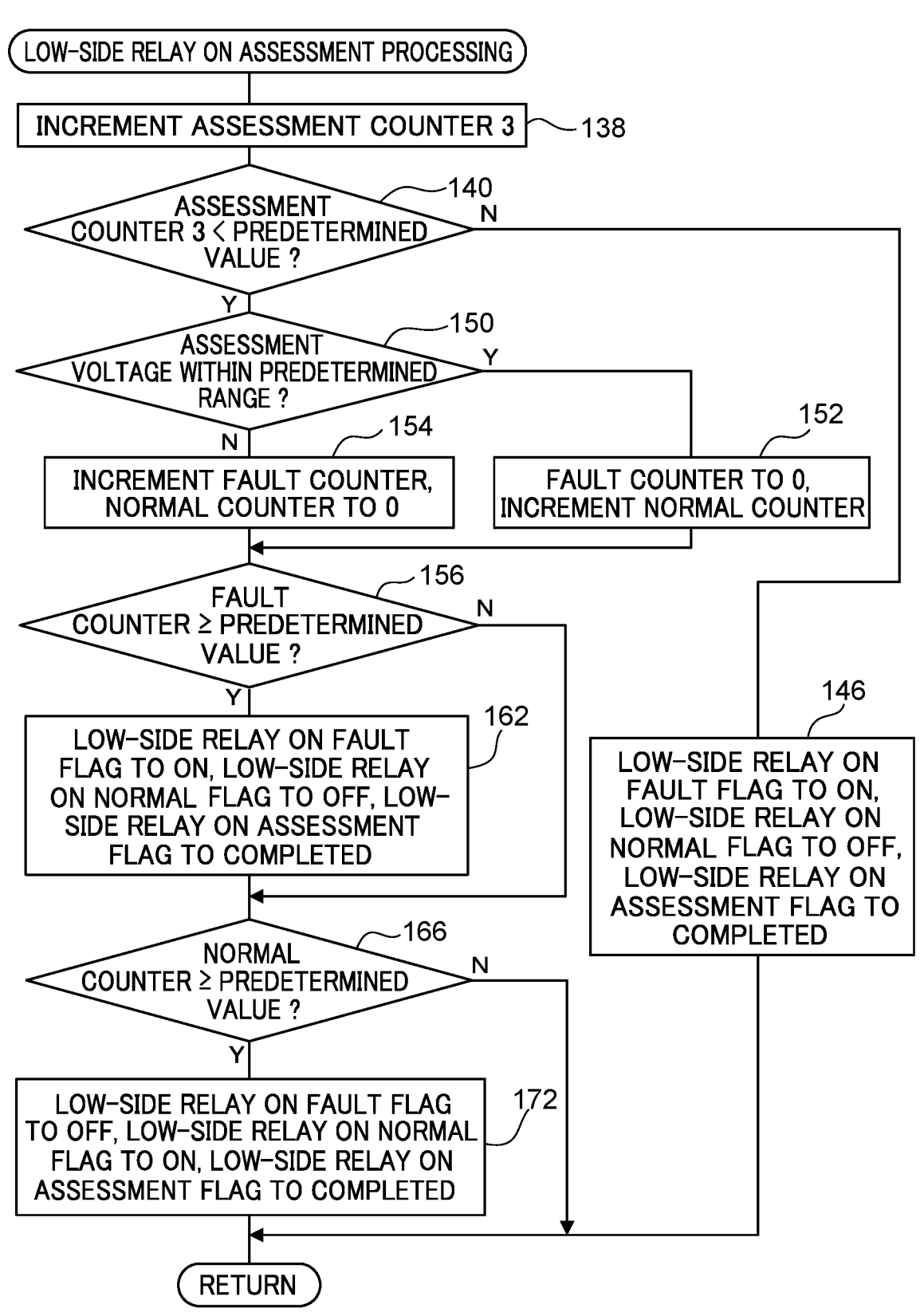
FIG. 22 is a flowchart illustrating low-side relay on assessment processing according to the second exemplary embodiment.

Now, of the low-side relay on assessment processing according to the second exemplary embodiment, only portions that differ from the corresponding processing described in the first exemplary embodiment (FIG. 16) are described with reference to FIG. 22. In step 138 of the low-side relay on assessment processing, the determination section 64 increments an assessment counter 3 for the assessment with the low-side relay on. In step 140, the determination section 64 makes a determination as to whether the assessment counter 3 is less than a predetermined value. This predetermined value may be set to, for example, a duration that is at least a duration in which the low-side relay on assessment processing is completed at normal times. When the result of the determination in step 140 is affirmative, the microcontroller 46 proceeds to step 150. The processing from step 150 onward is the same as in the first exemplary embodiment (FIG. 16).

When the assessment counter 3 is at least the predetermined value, the result of the determination in step 140 is negative and the microcontroller 46 proceeds to step 146. In step 146, the determination section 64 sets the low-side relay on fault flag to on, sets the low-side relay on normal flag to off, sets the low-side relay on assessment flag to "processing completed", and ends the low-side relay on assessment processing. Hence, if the low-side relay on assessment flag is on after the end of the fault detection processing, the microcontroller 46 may determine, on the basis of whether the assessment counter 3 is at least the predetermined value, whether or not a fault has occurred such that the assessment voltage repeatedly flips between normal and faulty during the execution of the low-side relay on assessment processing.

Figure 23:
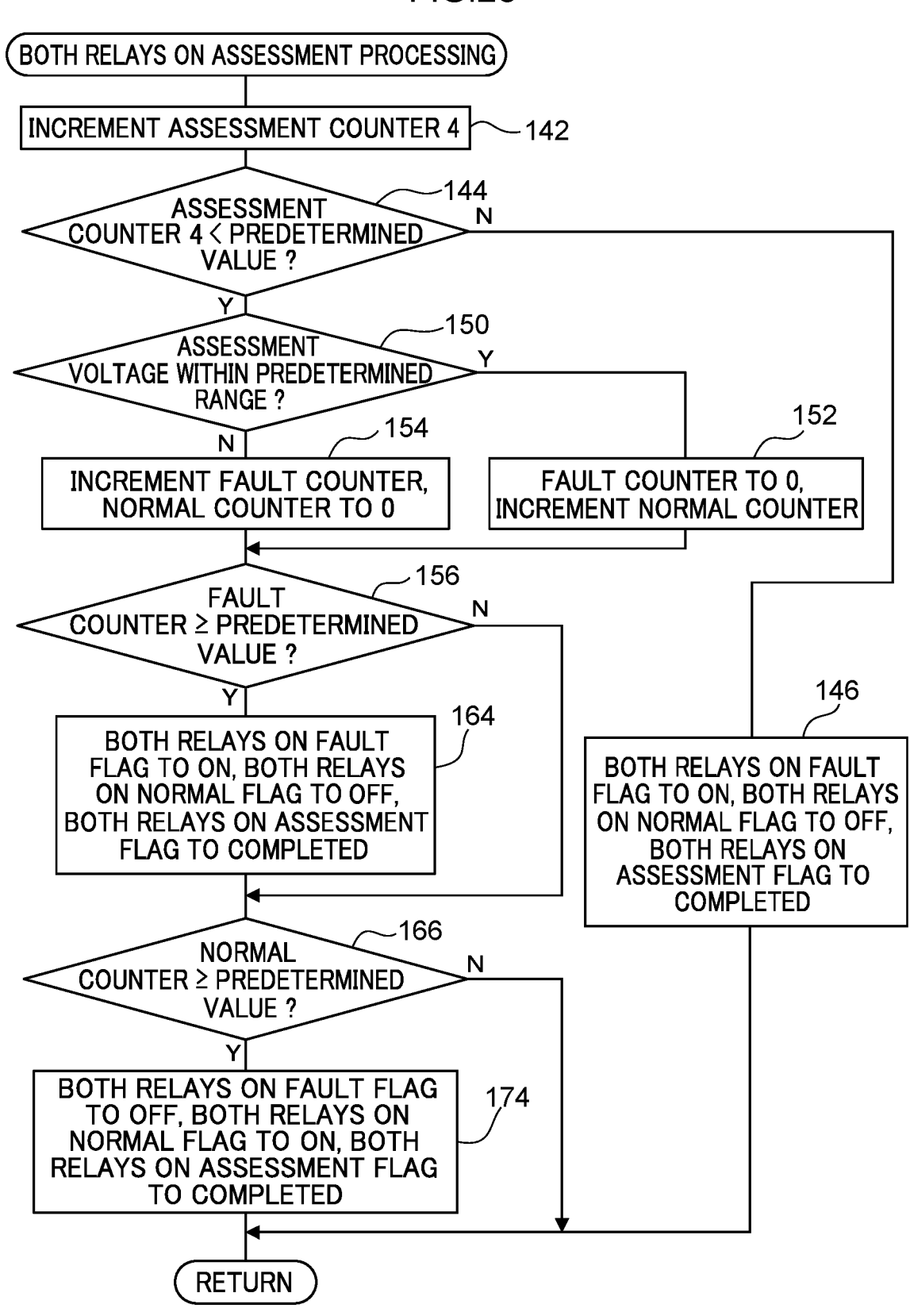
FIG. 23 is a flowchart illustrating both relays on assessment processing according to the second exemplary embodiment.

Now, of the both relays on assessment processing according to the second exemplary embodiment, only portions that differ from the corresponding processing described in the first exemplary embodiment (FIG. 17) are described with reference to FIG. 23. In step 142 of the both relays on assessment processing according to the second exemplary embodiment, the determination section 64 increments an assessment counter 4 for the assessment with both relays on. In step 144, the determination section 64 makes a determination as to whether the assessment counter 4 is less than a predetermined value. This predetermined value may be set to, for example, a duration that is at least a duration in which the both relays on assessment processing is completed at normal times. When the result of the determination in step 144 is affirmative, the microcontroller 46 proceeds to step 150. The processing from step 150 onward is the same as in the first exemplary embodiment (FIG. 17).

When the assessment counter 4 is at least the predetermined value, the result of the determination in step 144 is negative and the microcontroller 46 proceeds to step 146. In step 146, the determination section 64 sets the both relays on fault flag to on, sets the both relays on normal flag to off, sets the both relays on assessment flag to "processing completed", and ends the both relays on assessment processing.

Hence, if the both relays on assessment flag is on after the end of the fault detection processing, the microcontroller 46 may determine, on the basis of whether the assessment counter 4 is at least the predetermined value, whether or not a fault has occurred such that the assessment voltage repeatedly flips between normal and faulty during the execution of the both relays on assessment processing.

In the second exemplary embodiment, the driving circuit 42 is determination to have a fault in a case in which one or more of the both relays off fault flag, the high-side relay on fault flag, the low-side relay on fault flag and the both relays on fault flag is on, and the ten types of fault of the driving circuit 42 may be detected for comprehensively. In a case in which, of these four flags, only the high-side relay on fault flag is on, the fault of the driving circuit 42 may be identified as a high-side GND short-circuit. Therefore, a location at which a fault occurs and details of the fault may be narrowed down relative to the first exemplary embodiment.

On the other hand, in a case in which the both relays off fault flag, the high-side relay on fault flag, the low-side relay on fault flag and the both relays on fault flag are all off and the both relays off assessment flag, the high-side relay on assessment flag, the low-side relay on assessment flag and the both relays on assessment flag are all set to "processing completed", the driving circuit 42 may be determined to be normal.

Thus, in the second exemplary embodiment, the control section 62 switches the on and off states of the first relay 26 and second relay 28 into the fourth condition (high-side relay on) in which the first relay 26 is in the on state and the second relay 28 is in the off state. Hence, a location at which a fault occurs and details of the fault may be narrowed down.

In the first exemplary embodiment, a mode is described in which the first relay 26 and second relay 28 are successively switched into the three conditions—both relays off, low-side relay on and both relays on—and the assessment processing corresponding to each condition is successively executed. In the second exemplary embodiment, a mode is described in which the first relay 26 and second relay 28 are successively switched into the four conditions—both relays off, high-side relay on, low-side relay on and both relays on and the assessment processing corresponding to each condition is successively executed. However, in the present disclosure, a switching sequence of conditions of the first relay 26 and second relay 28 is not limited to the sequences described above but may be suitably modified.

In the above descriptions, modes are described in which the first relay 26 is employed as an example of the first switch relating to the present disclosure and the second relay 28 is employed as an example of the second switch. However, the present disclosure is not limited thus. The first switch and second switch may be alternative structures such as, for example, semiconductor switching elements or the like.

In the above descriptions, the heater 18 incorporated in the battery pack 10 is described as an example of the electric load of the present disclosure, but the present disclosure is not limited thus. For example, the electric load may be a heater incorporated at a gas sensor or the like.

In the above descriptions, a mode is described in which the fault detection program 58 stored (installed) in advance at the storage unit 52 is an example of a fault detection program relating to the present disclosure, but the present disclosure is not limited thus. The fault detection program relating to the present disclosure may be provided in a mode stored in a non-transitory storage medium such as an HDD, SSD, DVD or the like.

What is claimed is:

1. A fault detection device for detecting a fault of a driving circuit that includes a first switch provided between an electric load and a power supply section, a second switch provided between the electric load and earth, and a detection section that detects a voltage between the first switch and the electric load, the fault detection device comprising:

a memory; and a processor coupled to the memory, the processor being configured to:

perform control to put the first switch into an on state connecting the electric load with the power supply section or an off state disconnecting the electric load from the power supply section;

perform control to put the second switch into an on state connecting the electric load with earth or an off state disconnecting the electric load from earth; and determine a fault of the driving circuit on the basis of the on or off state of the first switch and the second switch and the voltage detected by the detection section, wherein the processor is further configured to:

on the basis of the voltage detected in a second condition in which the first switch is in the off state and the second switch is in the on state, determine the fault of the driving circuit in a case in which there is a short circuit to the power supply from between the first switch and the electric load;

on the basis of the voltage detected in a first condition in which both the first switch and the second switch are in the off states, a third condition in which both the first switch and the second switch are in the on states, or a fourth condition in which the first switch is in the on state and the second switch is in the off state, determine the fault of the driving circuit in a case in which there is a short circuit to earth from between the first switch and the electric load;

on the basis of the voltage detected in the second condition, determine the fault of the driving circuit in a case in which there is a disconnection between the first switch and the electric load;

on the basis of the voltage detected in the second condition, determine the fault of the driving circuit in a case in which the first switch is stuck in the on state; and on the basis of the voltage detected in the third condition, determine the fault of the driving circuit in a case in which the first switch is stuck in the off state.

2. The fault detection device according to claim 1, wherein the processor is configured to:

successively switch the first switch and the second switch into a plurality of conditions that differ from one another in the on and off states of the first switch and the second switch; and determine a fault of the driving circuit on the basis of the on or off state of the first switch and the second switch in each of the plurality of conditions and voltages respectively detected by the detection section in the plurality of conditions.

3. The fault detection device according to claim 1, wherein the processor is configured to:

control on and off states of the first switch and the second switch at a time of start-up of the driving circuit; and determine a fault of the driving circuit on the basis of the on or off state of the first switch and the second switch at the time of start-up of the driving circuit and the voltage detected by the detection section.

4. The fault detection device according to claim 1, wherein the processor is configured to switch the on or off state of the first switch and the second switch into a first condition in which both the first switch and the second switch are in the off states, a second condition in which the first switch is in the off state and the second switch is in the on state, and a third condition in which both the first switch and the second switch are in the on states.

5. The fault detection device according to claim 4, wherein the processor is further configured to switch the on and off states of the first switch and the second switch into a fourth condition in which the first switch is in the on state and the second switch is in the off state.

6. A fault detection device for detecting a fault of a driving circuit that includes a first switch provided between an electric load and a power supply section, a second switch provided between the electric load and earth, and a detection section that detects a voltage between the first switch and the electric load, the fault detection device comprising:

a memory; and a processor coupled to the memory, the processor being configured to:

perform control to put the first switch into an on state connecting the electric load with the power supply section or an off state disconnecting the electric load from the power supply section;

perform control to put the second switch into an on state connecting the electric load with earth or an off state disconnecting the electric load from earth; and determine a fault of the driving circuit on the basis of the on or off state of the first switch and the second switch and the voltage detected by the detection section, wherein the processor is further configured to:

on the basis of the voltage detected in a second condition in which the first switch is in the off state and the second switch is in the on state, determine the fault of the driving circuit in a case in which there is a short circuit to the power supply from between the second switch and the electric load;

on the basis of the voltage detected in a first condition in which both the first switch and the second switch are in the off states, determine the fault of the driving circuit in a case in which there is a short circuit to earth from between the second switch and the electric load;

on the basis of the voltage detected in the second condition, determine the fault of the driving circuit in a case in which there is a disconnection between the second switch and the electric load;

on the basis of the voltage detected in the first condition, determine the fault of the driving circuit in a case in which the second switch is stuck in the on state; and on the basis of the voltage detected in the second condition, determine the fault of the driving circuit in case in which the second switch is stuck in the off state.

7. The fault detection device according to claim 1, wherein the processor is configured to:

determine whether the driving circuit is normal or faulty on the basis of voltages detected by the detection section a plurality of times while the on or off state of the first switch and the second switch are in a constant condition; and

US 12,641,681 B2

21 determine that there is a fault of the driving circuit in a
   case in which the fault is determined a predetermined
   number of times in succession.

8. The fault detection device according to claim 1,
wherein the electric load is a heater.

9. A load driving device comprising:

the fault detection device according to claim 1;

the driving circuit including the first switch and the
   second switch; and the detection section.

\* \* \* \* \*